US008238295B2

(12) United States Patent
Palanki et al.

(10) Patent No.: US 8,238,295 B2
(45) Date of Patent: Aug. 7, 2012

(54) DEMODULATION OF A SUBSET OF AVAILABLE LINK ASSIGNMENT BLOCKS

(75) Inventors: Ravi Palanki, San Diego, CA (US);
Alexei Gorokhov, San Diego, CA (US);
Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 992 days.

(21) Appl. No.: 12/022,085

(22) Filed: Jan. 29, 2008

(65) Prior Publication Data

US 2008/0182585 A1 Jul. 31, 2008

Related U.S. Application Data

(60) Provisional application No. 60/887,338, filed on Jan. 30, 2007.

(51) Int. Cl.
*H04W 4/00* (2009.01)
(52) U.S. Cl. ......... 370/329; 370/338; 370/341; 370/348
(58) Field of Classification Search .................. 370/328, 370/329, 330, 341, 348, 338
See application file for complete search history.

(56) References Cited

U.S. PATENT DOCUMENTS

| | | | | |
|---|---|---|---|---|
| 5,475,374 | A * | 12/1995 | Moore | 455/343.2 |
| 2005/0249131 | A1 | 11/2005 | Takahashi et al. | |
| 2006/0193286 | A1* | 8/2006 | Naghian et al. | 370/328 |
| 2008/0025338 | A1 | 1/2008 | Gorokhov | |
| 2008/0070704 | A1 | 3/2008 | Muller et al. | |
| 2010/0195614 | A1* | 8/2010 | Nimbalker et al. | 370/330 |

FOREIGN PATENT DOCUMENTS

| | | |
|---|---|---|
| EP | 1392074 A2 | 2/2004 |
| EP | 1418686 | 5/2004 |
| EP | 1418686 A2 | 5/2004 |
| RU | 2003127411 A | 4/2005 |
| WO | WO0245456 A1 | 6/2002 |
| WO | WO02095960 | 11/2002 |

(Continued)

OTHER PUBLICATIONS

International Search Report—PCT/US08/052529—International Search Authority—European Patent Office—Jul. 3, 2008.

(Continued)

*Primary Examiner* — Brian D Nguyen
*Assistant Examiner* — Toan Nguyen
(74) *Attorney, Agent, or Firm* — Donald Kordich; Peter A. Clevenger

(57) ABSTRACT

Systems and methodologies are described that facilitate assigning indices to link assignment blocks (LABs) communicated via a downlink. Indices in a first subset are allocated to shared LABs, which are decoded by a plurality of access terminals. Indices in a second subset are assigned to unshared LABs, which are each intended for a particular recipient access terminal. Assignment of an index for each unshared LAB can be based upon a hash of an identifier corresponding to an intended recipient access terminal and/or access terminal capabilities. Moreover, an access terminal can decode LABs based upon corresponding indices. LABs with indices in a first range can be identified as shared LABs and decoded. Further, the access terminal can determine a second range of indices corresponding to unshared LABs to decode; the second range of indices includes fewer than all indices corresponding to unshared LABs in a frame sent by a base station.

111 Claims, 12 Drawing Sheets

FOREIGN PATENT DOCUMENTS

| | | |
|---|---|---|
| WO | WO2005067182 A1 | 7/2005 |
| WO | 2008014388 A2 | 1/2008 |

OTHER PUBLICATIONS

Written Opinion—PCT/US08/052529—International Search Authority—European Patent Office, Berlin—Jul. 3, 2008.

3rd Generation Partnership Project (3GPP); Technical Specification Group (TSG); Radio Access Network (RAN); Work group 2 (WG2), XX, XX, vol. 54, Aug. 28, 2006, pp. 1-4, XP002460379.

International Search Report & Written Opinion—PCT/US2008/052529, International Search Authority—European Patent Office—Jul. 3, 2008.

"Paging Mechanism in E-UTRAN" 3rd Generation Partnership Project (SGPP); Technicalspecification Group (TSG) Radio Access Network (RAN); Workinggroup 2 (WG2), XX, XX, vol. 54, Aug. 28, 2006, pp. 1-4, XP002460379.

Taiwan Search Report—TW097103624—TIPO—Jun. 17, 2011.

Ericsson, "Paging Mechanism in E-UTRAN", 3GPP R2-062128, 3GPP, Aug. 28, 2006, pp. 1-4.

3GPP TS 36.213. "3rd Generation Partnership Project; Technical Specification Group Radio Access Network; Physical layer procedures", version 0.2.0, Release Oct. 8, 2006.

* cited by examiner

DEMODULATION OF A SUBSET OF AVAILABLE LINK ASSIGNMENT BLOCKS

CROSS-REFERENCE TO RELATED APPLICATIONS

This application claims the benefit of U.S. Provisional Patent application Ser. No. 60/887,338 entitled "A METHOD AND APPARATUS FOR USING A SHARED CONTROL MAC PROTOCOL" which was filed Jan. 30, 2007. The entirety of the aforementioned application is herein incorporated by reference.

BACKGROUND

I. Field

The following description relates generally to wireless communications, and more particularly to enabling access terminals to decode subsets of link assignment blocks (LABs) transferred from base stations in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Base stations can communicate link assignment blocks (LABs) over the downlink. Each LAB can provide assignment related information to particular access terminal(s). Conventionally, an access terminal decodes each LAB communicated via the downlink from a base station to identify a subset of LABs intended for that particular access terminal. However, a large number of the decoded LABs can be directed towards disparate access terminal(s); accordingly, significant resource expenditures (e.g., time, processor cycles, . . . ) can be outlaid by the access terminal when employing common techniques where all or most of the LABs transferred from the base station are decoded. These resource expenditures can impact access terminal performance such as, for example, by diminishing a data rate utilized in connection with decoding data actually directed to a particular access terminal.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating assignment of indices to link assignment blocks (LABs) communicated via a downlink. Indices in a first subset are allocated to shared LABs, which are decoded by a plurality of access terminals. Indices in a second subset are assigned to unshared LABs, which are each intended for a particular recipient access terminal. Assignment of an index for each unshared LAB can be based upon a hash of an identifier corresponding to an intended recipient access terminal and/or access terminal capabilities. Moreover, an access terminal can decode LABs based upon corresponding indices. LABs with indices in a first range can be identified as shared LABs and decoded. Further, the access terminal can determine a second range of indices corresponding to unshared LABs to decode; the second range of indices includes fewer than all indices corresponding to unshared LABs in a frame sent by a base station.

According to related aspects, a method that facilitates sending frames that include control messages in a wireless communication environment is described herein. The method can include assigning indices to a set of control messages. Further, the method can comprise restricting transmission of respective subsets of the control messages to respective, intended recipient access terminals based on the indices.

Another aspect relates to a wireless communications apparatus. The wireless communications apparatus can include a memory that retains instructions related to assigning indices to a set of control messages and restricting transmission of respective subsets of the control messages to respective, intended recipient access terminals based on the indices. Further, the wireless communications apparatus can include a processor, coupled to the memory, configured to execute the instructions retained in the memory.

Yet another aspect relates to a wireless communications apparatus that enables assigning indices to link assignment blocks (LABs) and organizing LABs based thereupon in a wireless communication environment. The wireless communications apparatus can include means for allocating indices to shared LABs. Further, the wireless communications apparatus can include means for allotting indices to unshared LABs based upon access terminal capabilities and hashes of identifiers of respective, intended recipient access terminals. Moreover, the wireless communications apparatus can comprise means for sending the shared LABs and the unshared LABs organized based on the assigned indices.

Still another aspect relates to a machine-readable medium having stored thereon machine-executable instructions for assigning indices to a set of control messages; and restricting transmission of respective subsets of the control messages to respective, intended recipient access terminals based on the indices.

In accordance with another aspect, an apparatus in a wireless communication system can include a processor, wherein the processor can be configured to assign indices to a set of control messages. Moreover, the processor can be configured to restrict transmission of respective subsets of the control messages to respective, intended recipient access terminals based on the indices.

According to other aspects, a method that facilitates decoding a subset of control messages in a wireless communication environment is described herein. The method can include receiving a set of indexed control messages. Moreover, the method can include decoding a subset of the indexed control messages identified based upon corresponding indices.

Yet another aspect relates to a wireless communications apparatus that can include a memory that retains instructions related to obtaining a set of indexed control messages and decoding a subset of the indexed control messages identified based upon corresponding indices. Further, the wireless communications apparatus can comprise a processor, coupled to the memory, configured to execute the instructions retained in the memory.

Another aspect relates to a wireless communications apparatus that enables decoding a subset of received link assignment blocks (LABs) in a wireless communication environment. The wireless communications apparatus can include means for demodulating shared LABs recognized based upon a first range of indices. Further, the wireless communications apparatus can comprise means for identifying a second range of indices based on a hash of an access terminal identifier and an access terminal capability measure. Moreover, the wireless communications apparatus can include means for demodulating unshared LABs recognized based upon the second range of indices.

Still another aspect relates to a machine-readable medium having stored thereon machine-executable instructions for receiving a set of indexed control messages, and decoding a subset of the indexed control messages identified based upon corresponding indices.

In accordance with another aspect, an apparatus in a wireless communication system can include a processor, wherein the processor can be configured to obtain a set of indexed control messages. Further, the processor can be configured to decode a subset of the indexed control messages identified based upon corresponding indices.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
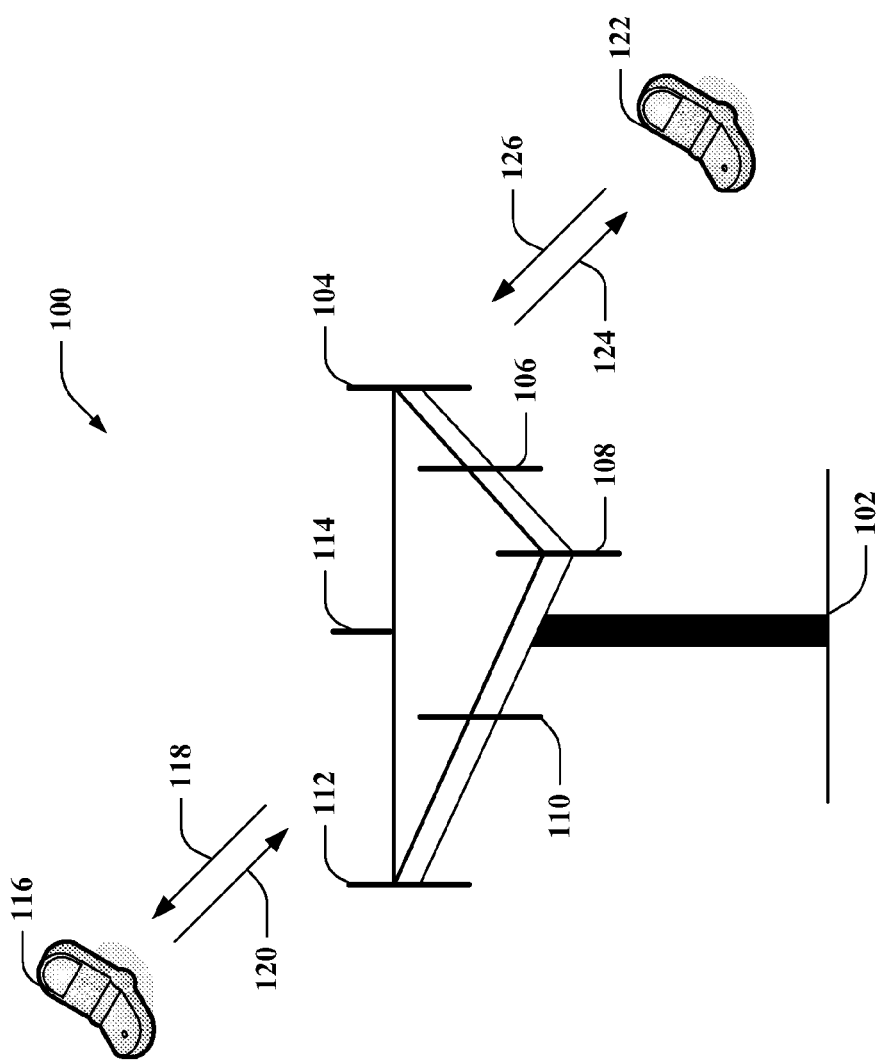
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE).

An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Base station 102 can transmit a plurality of link assignment blocks (LABs) (e.g., link assignment messages (LAMs), ...) over the forward link. A subset of the LABs can be shared LABs, which are messages that each access terminal 116, 122 in the geographic area covered by base station 102 are to decode and/or demodulate; the remainder of the LABs can be individual LABs (e.g., unshared LABs) that are each intended for a respective one of access terminals 116, 122. Thus, each access terminal 116, 122 in the geographic area covered by base station 102 can be the intended recipient of a subset of the LABs sent by base station 102.

A particular access terminal 116, 122 can discern whether a LAB is intended for that particular access terminal 116, 122 by decoding the LAB. For instance, the particular access terminal 116, 122 can decode a LAB and determine an identifier associated therewith (e.g., the LAB can be scrambled with the identifier of an access terminal 116, 122 to which the LAB is intended, which may or may not be the particular access terminal 116, 122 decoding the LAB). If the identifier associated with the LAB matches an identifier of the particular access terminal 116, 122 that decodes the LAB, then the particular access terminal 116, 122 can further employ the content of the LAB (e.g., implement assignment information included in the LAB, transmit and/or receive according to the assignment information, . . . ). Rather than the particular access terminal 116, 122 decoding all or most of the LABs in the set (e.g., set of LABs transmitted in a physical (PHY) frame) sent by base station 102, a subset of the LABs can be decoded by the particular access terminal 116, 122; similarly, other access terminals 116, 122 can also decode respective subsets of the LABs transferred from base station 102. Accordingly, base station 102 can determine which subset of LABs will be decoded by each access terminal 116, 122. Moreover, base station 102 can direct LAB(s) to particular access terminal(s) 116, 122 by transferring the LAB(s) within the identified subset corresponding to the particular access terminal(s) 116, 122 (e.g., as a function of index assignments).

LABs transmitted by base station 102 can be forward link assignment blocks and/or reverse link assignment blocks. Forward link assignment blocks are messages that inform access terminals 116, 122 about modifications of resources used for communication on the forward link. Further, reverse link assignment blocks are messages that inform access terminals 116, 122 about modifications of resources used for communication on the reverse link. For instance, a LAB can inform a particular access terminal 116, 122 to employ a specified bandwidth for communication via the forward link or reverse link. Moreover, the LAB can indicate a packet format to be employed for such communication over the specified bandwidth. Further, each LAB can include an identifier that uniquely corresponds to a particular access terminal 116, 122 (e.g., the identifier can be encoded in the LAB). According to an example, the identifier can be a Media Access Control Identifier (MACID) of a particular access terminal 116, 122. Pursuant to another illustration, the identifier can be a broadcast MACID, in which case the LAB that includes the broadcast MACID can be demodulated by all access terminals 116, 122 in the sector.

Figure 2:
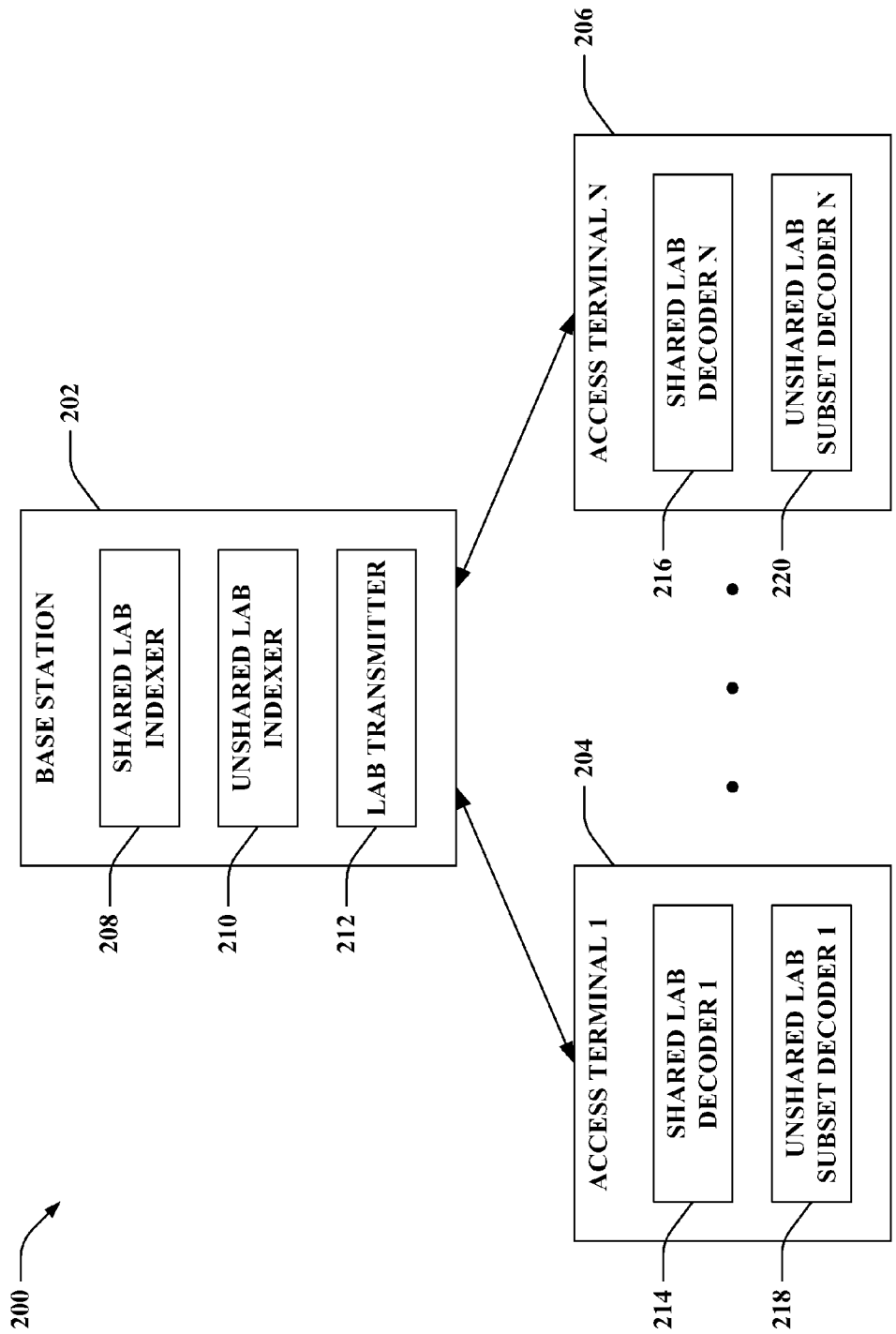
FIG. 2 is an illustration of an example system that indexes link assignment blocks (LABs) to enable directing the LABs to particular access terminals.

Now referring to FIG. 2, illustrated is system 200 that indexes link assignment blocks (LABs) to enable directing the LABs to particular access terminals. System 200 includes a base station 202 that can communicate with one or more access terminals (e.g., an access terminal 1 204, ..., an access terminal N 206, where N can be any integer). Base station 202 can transmit shared LABs and/or unshared LABs over the forward link to access terminal(s) 204-206. According to an illustration, base station 202 can send a set of LABs over a Shared Control Channel (SCCH). Moreover, based upon the content (e.g., assignment related information) of the LABs, forward link and/or reverse link communication can be effectuated between access terminal(s) 204-206 to which the LABs are directed and base station 202.

Base station 202 can further include a shared LAB indexer 208, an unshared LAB indexer 210, and a LAB transmitter 212. LABs transmitted by LAB transmitter 212 in each frame can be indexed by shared LAB indexer 208 and/or unshared LAB indexer 210. Shared LAB indexer 208 can index each shared LAB and unshared LAB indexer 210 can index each unshared LAB. By way of illustration, the indices can be utilized to order a sequence of LABs (e.g., shared LABs and unshared LABs) included in a frame. Moreover, it is contemplated that a common LAB indexer (not shown) can be utilized in place of the separate shared LAB indexer 208 and unshared LAB indexer 210; the common LAB indexer can index both shared LAB(s) and unshared LAB(s). After being indexed, LABs can be sent from base station 202 to access terminals 204-206 by LAB transmitter 212.

LABs transferred in each frame by LAB transmitter 212 can be indexed according to various rules implemented by shared LAB indexer 208 and unshared LAB indexer 210. A total number of LABs that can be transmitted in one physical (PHY) frame by LAB transmitter 212 can be referred to as MaxNumLABs (e.g., MaxNumQPSKLABs, ... ). Moreover, each LAB in each PHY frame can be assigned an index by shared LAB indexer 208 and/or unshared LAB indexer 210. A subset of the total number of LABs included in a frame can be shared LABs, which are directed towards every access terminal 204-206 in the coverage area of base station 202 for decoding. Accordingly, each access terminal 204-206 can decode the shared LABs. The number of shared LABs can be referred to as MaxNumSharedLABs.

Pursuant to an example, shared LAB indexer 208 and unshared LAB indexer 210 can index LABs in a set f, where f=0, ..., MaxNumLABs−1. The set f can include two subsets: a first subset for shared LABs and a second subset for individual LABs (e.g., unshared LABs). Shared LAB indexer 208 can allocate indices of shared LABs in the first subset; the indices for the shared LABs can be f=0, ..., MaxNumSharedLABs−1. The second subset can have indices allotted by unshared LAB indexer 210; the indices for the second subset can be f=MaxNumSharedLABs, ..., MaxNumLABs. Further, unshared LAB indexer 210 can divide indices in the second subset based upon capabilities of access terminal(s) 204-206. Access terminal capabilities (e.g., access terminal capability measure, ... ) can set forth a number of LABs to be decoded by a particular access terminal (e.g., all access terminals 204-206 can decode a similar number of LABs, all access terminals 204-206 can decode differing numbers of LABs, at least two access terminals 204-206 can decode a similar number of LABs while at least one other access terminal 204-206 decodes a differing number of LABs, ... ). For instance, access terminal capabilities can be defined according to a capability protocol (e.g., retained in memory, ... ). By way of another illustration, capabilities of access terminal(s) 204-206 can be communicated to unshared LAB indexer 210 (e.g., from access terminal(s) 204-206, a disparate base station, a network, ... ).

The maximum number of individual LABs that one access terminal (e.g., access terminal 1 204, ..., access terminal N 206) can decode can be referred to as MaxNumIndivLABDec. Further, each access terminal 204-206 can be associated with a corresponding MACID; base station 202 can allocate MACIDs to access terminals 204-206 (e.g., MACIDs can be allotted by base station 202 as part of access grant messages sent to access terminal 204-206). The MACID, for instance, can be a sector-specific access terminal identifier. Unshared LAB indexer 210 can assign indices to LABs intended for particular access terminals 204-206 as a function of MACIDs of the particular access terminals 204-206. Thus, individual LABs intended for a specific access terminal (e.g., access terminal 1 204, ... ) with MACID m can be allotted indices based upon a hash of the MACID as follows: MaxNumSharedLABs+$f_{HASH}$(MACID), ..., MaxNumSharedLABs+($f_{HASH}$(MACID)+MaxNumIndivLABDec−1)mod(MaxNumLABs−MaxNumSharedLABs). According to an illustration, a particular LAB (e.g., unshared LAB) can be directed towards a particular access terminal (e.g., access terminal 1 204) assigned MACID 0. It is to be appreciated, however, that the claimed subject matter is not limited to sending the unshared LAB to access terminal 1 204 or that access terminal 1 204 is assigned MACID 0. Further, the hash of MACID 0 can be 0. Thus, access terminal 1 204 can decode LABs with indices from MaxNumSharedLABs to its capability (e.g., MaxNumIndivLABDec) plus MaxNumSharedLABs, where the capability is the number of LABs that access terminal 1 204 can decode. Hence, unshared LAB indexer 210 can allot an index for the particular LAB within such range (e.g., MaxNumSharedLABs, ..., MaxNumIndivLABDec+MaxNumSharedLABs) when directing the particular LAB to access terminal 1 204. Moreover, LAB transmitter 212 can send the particular LAB (and/or any other LABs) with corresponding indexing via the forward link.

Each access terminal 204-206 can further include a shared LAB decoder (e.g., access terminal 1 204 can include a shared LAB decoder 1 214, ..., access terminal N can include a shared LAB decoder N 216) and an unshared LAB subset decoder (e.g., access terminal 1 204 can include an unshared LAB subset decoder 1 218, ... access terminal N 206 can include an unshared LAB subset decoder N 220). Shared LAB decoders 214-216 can decode shared LABs obtained from base station 202. More particularly, shared LAB decoders 214-216 can identify LABs with indices from 0 to MaxNumSharedLABs−1 as being shared LABs. Further, shared LAB decoders 214-216 can decode the LABs identified to be shared LABs based upon evaluation of the associated indices. Hence, every access terminal 204-206 in a geographic area covered by base station 202 can decode a number (e.g., MaxNumSharedLABs) of shared LABs.

Unshared LAB subset decoders 218-220 can decode respective subsets of unshared LABs. According to an example, unshared LAB subset decoder 1 218 can identify a subset of unshared LABs to decode for access terminal 1 204 based upon capabilities of access terminal 1 204 (e.g., number of unshared LABs to be decoded by access terminal 1 204 which can be referred to as MaxNumIndivLABDec) and a hash function of a MACID corresponding to access terminal 1 204. For instance, unshared LAB subset decoder 1 218 can determine a range of LAB indices as a function of the capabilities and the hash of the MACID; the range can extend for a maximum number of unshared LABs that can be decoded by access terminal 1 204. Moreover, unshared LAB subset decoder 1 218 can decode LABs with indices that fall within the determined range. Further, upon being decoded, unshared LAB subset decoder 1 214 (and/or access terminal 1 204 in general) can evaluate whether the decoded LAB includes the MACID of access terminal 1 204 (e.g., the MACID of access terminal 1 204 is encoded in this LAB). If the MACID is included in the LAB, then access terminal 1 204 can utilize contents of the LAB; otherwise, if the LAB fails to include the MACID of access terminal 1 204, the LAB can be discarded without being employed. By decoding a subset of unshared LABs rather than all or most unshared LABs as oftentimes occurs with conventional techniques, access terminal 1 204 can conserve resources for decoding data directed thereto rather than decoding a large number of LABs unintended for access terminal 1 204. Although the foregoing describes unshared LAB subset decoder 1 218 and access terminal 1 204, it is to be appreciated that any other unshared LAB subset decoder (e.g., unshared LAB subset decoder N 220, . . . ) and/or access terminal (e.g., access terminal N 206) can be substantially similar.

Figure 3:
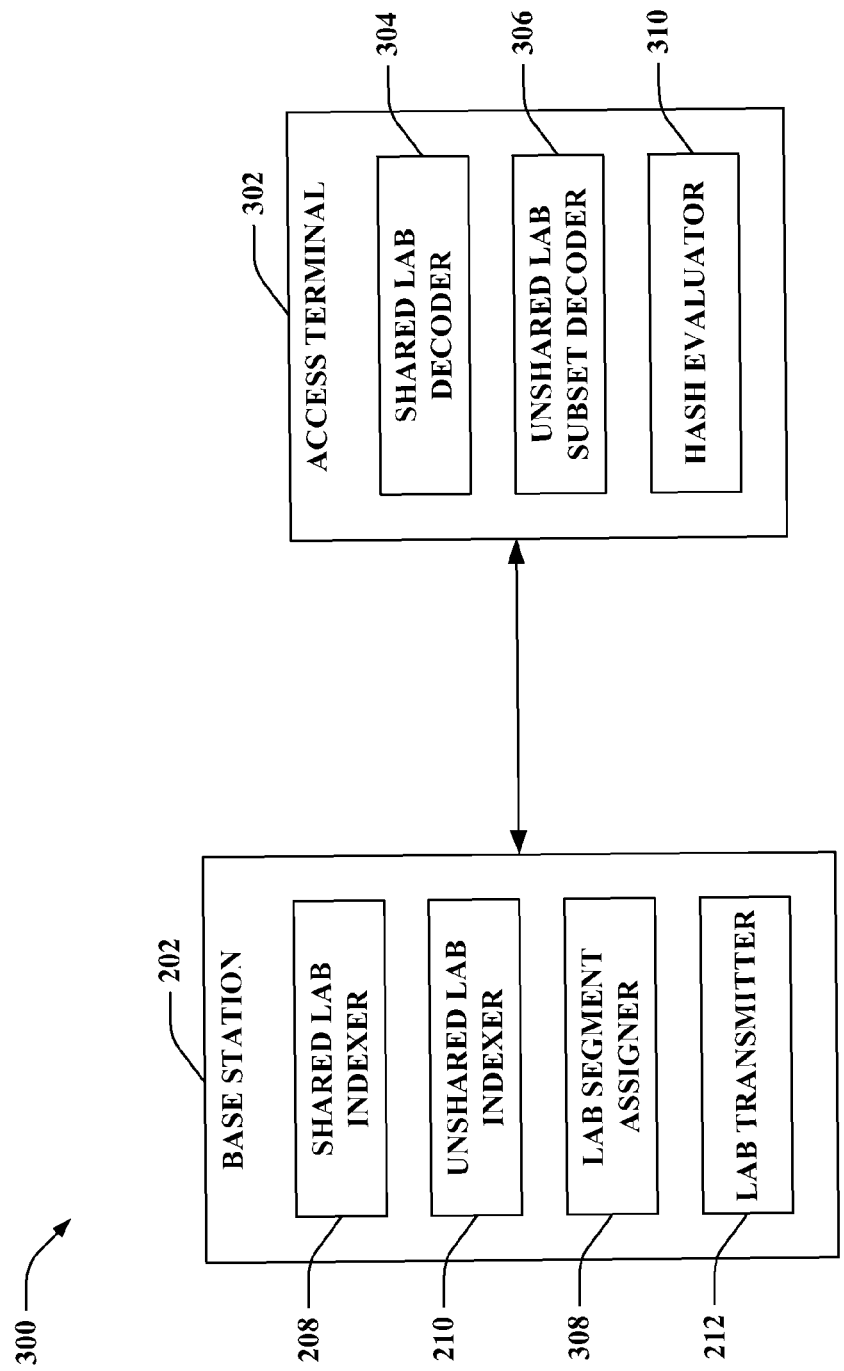
FIG. 3 is an illustration of an example system that organizes link assignment blocks (LABs) within LAB segments for transfer in a wireless communication environment.

Turning to FIG. 3, illustrated is a system 300 that organizes link assignment blocks (LABs) within LAB segments for transfer in a wireless communication environment. System 300 includes base station 202 which can further comprise shared LAB indexer 208, unshared LAB indexer 210, and LAB transmitter 212 as described above. Further, system 300 includes an access terminal 302 (e.g., access terminal 1 204 of FIG. 2, access terminal N 206 of FIG. 2, . . . ); although one access terminal 302 is depicted, it is contemplated that system 300 can include any number of access terminals similar to access terminal 302. Access terminal 302 can additionally include a shared LAB decoder 304 (e.g., shared LAB decoder 1 214 of FIG. 2, shared LAB decoder N 216 of FIG. 2, . . . ) and an unshared LAB subset decoder 306 (e.g., unshared LAB subset decoder 1 218 of FIG. 2, unshared LAB subset decoder N 220 of FIG. 2, . . . ).

Base station 202 can also include a LAB segment assigner 308 that allocates each LAB to a corresponding LAB segment. According to an illustration, LAB segment assigner 308 can operate in conjunction with unshared LAB indexer 210 to determine indices to allocate to unshared LABs to enable organizing such unshared LABs within LAB segments. A LAB segment is an OFDM resource (e.g., time/frequency resource) upon which one or more LABs are communicated. LAB segment assigner 308 groups LABs intended for a common recipient (e.g., access terminal 302, . . . ) into a common LAB segment. For example, unshared LABs directed for access terminal 302 can be assembled together and assigned to one LAB segment (or more than one LAB segment) by LAB segment assigner 308; thus, access terminal 302 can obtain all unshared LABs directed to access terminal 302 upon this LAB segment. LAB segment assigner 308 can minimize a number of LAB segments utilized to send unshared LABs to access terminal 302. Hence, a number of channel estimations associated with LAB segments performed by access terminal 302 can be reduced while decoding the LABs.

Access terminal 302 can further include a hash evaluator 310. Hash evaluator 310 analyzes a hash function based upon a MACID of access terminal 302 while minimizing a number of LAB segments which are utilized for receiving LABs transmitted from base station 202. For example, hash evaluator 310 adjusts an output of the hash function to align the indices of unshared LABs in a minimum number of LAB segments. Further, hash evaluator 310 can have a priori knowledge of a manner by which LAB segment assigner 308 allots unshared LABs to LAB segments.

The following provides an example technique that can be implemented by LAB segment assigner 308 to allocate LABs to LAB segments. LAB segment assigner 308 can assign LABs to LAB segments for access terminal 302 and/or any number of disparate access terminals (not shown). Further, hash evaluator 310 can employ this technique to discern which LABs obtained from base station 202 to decode. For instance, if a MACID of access terminal 302 hashes to a range of indices that spread across two LAB segments, the hash function can be changed to allow for all LABs to fall in one LAB segment.

According to this example, access terminal 302 can decode forward link Shared Control Channel (F-SCCH) blocks (i,j) with the value of i in the range 0, . . . , min(MaxNumShared-LABs, MaxSCCHDecodedBlocks)−1. The j index can be 0 for a large LAB, 0 or 1 for smaller LABs if two LABs are sent in a LAB slot, and so forth. Moreover, if MaxSCCHDecodedBlocks>MaxNumSharedLABs and MaxNumQPSKLABs>MaxNumSharedLABs, then S(MACID) can be defined according to the following. A total number of LABs that are not shared can be referred to as MaxNumUnsharedLABs, which can equal a maximum number of LABs (e.g., MaxNumQPSKLABs) minus a maximum number of shared LABs (e.g., MaxNumSharedLABs). Further, $b = f_{PHY\text{-}HASH}(MACID) \mod MaxNumUnsharedLABs$. Additionally, x=min(MaxSCCHDecodedBlocks−MaxNumSharedLABs, MaxNumUnsharedLABs). $L_K$ can be defined to be a total number of LABs excluding shared LABs that are contained in LAB segments with indices k or less. For instance, a common segment can have index 0 and a first LAB segment can have an index 1; however, the claimed subject matter is not so limited. A Physical Layer Protocol can specify the notion of common segment and LAB segment and a number of LABs in each segment. Additionally, s can be a maximum integer that satisfies $L_{s-1} < b$.

If $b+x-1 < L_s$, then S(MACID) can be defined to equal {b, . . . , b+x−1}. If $x \leq L_s - L_{s-1}$ and $b+x-1 \geq L_s$, then S(MACID) can be defined as follows: for odd values of MACID, S(MACID)={$L_{s-1}$, . . . , $L_{s-1}$+x−1}; else, S(MACID)= {$L_s$−x, . . . , $L_s$−1}. If $x > L_s - L_{s-1}$ and b+x−1≧MaxNumUnsharedLABs, then S(MACID) can be defined to equal {b, . . . , b+x−1} If $x > L_s - L_{s-1}$ and b+x−1≧MaxNumUnsharedLABs, then S(MACID)={b, . . . , MaxNumUnsharedLABs−1}∪{0, 1, . . . , x−1−(MaxNumUnsharedLABs−b)}. Accordingly, access terminal 302 (e.g., shared LAB decoder 304 and/or unshared LAB subset decoder 306 based upon an evaluation yielded by hash evaluator 310) can decode F-SCCH blocks (MaxNumSharedLABs+i,j) with the value of i belonging to S(MACID) as set forth above.

Referring to FIGS. 4-7, methodologies relating to utilizing indices for LABs to optimize resource utilization in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 4:
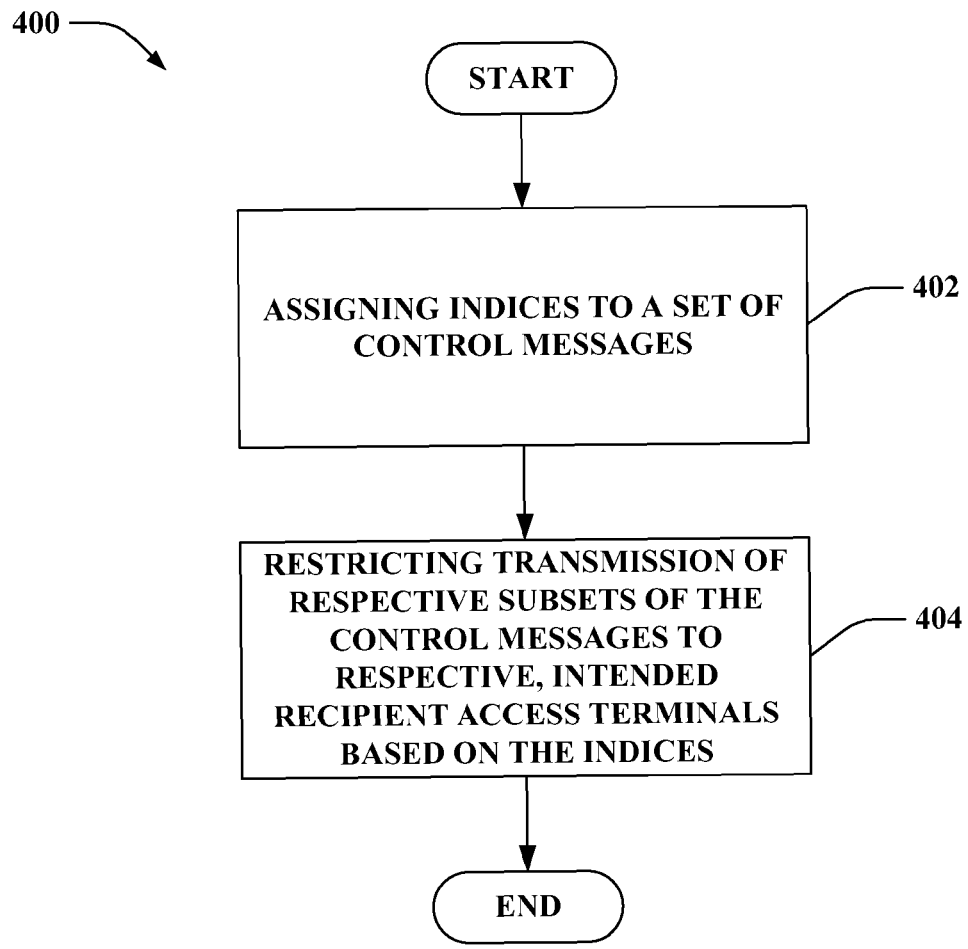
FIG. 4 is an illustration of an example methodology that facilitates sending frames that include control messages in a wireless communication environment.

Turning to FIG. 4, illustrated is a methodology that facilitates sending frames that include control messages in a wireless communication environment. At 402, indices can be assigned to a set of control messages. For instance, the control messages can be link assignment blocks (LABs). Moreover, the set of control messages can include shared LABs and unshared LABs. At 404, transmission of respective subsets of the control messages can be restricted to respective, intended recipient access terminals based on the indices. According to an illustration, the assigned indices can be utilized to direct a particular subset of control messages to a particular intended recipient access terminal. Moreover, each subset of control messages can be restricted to a subset of time-frequency resource groups (e.g., tiles) allocated to the set of control segments.

Figure 5:
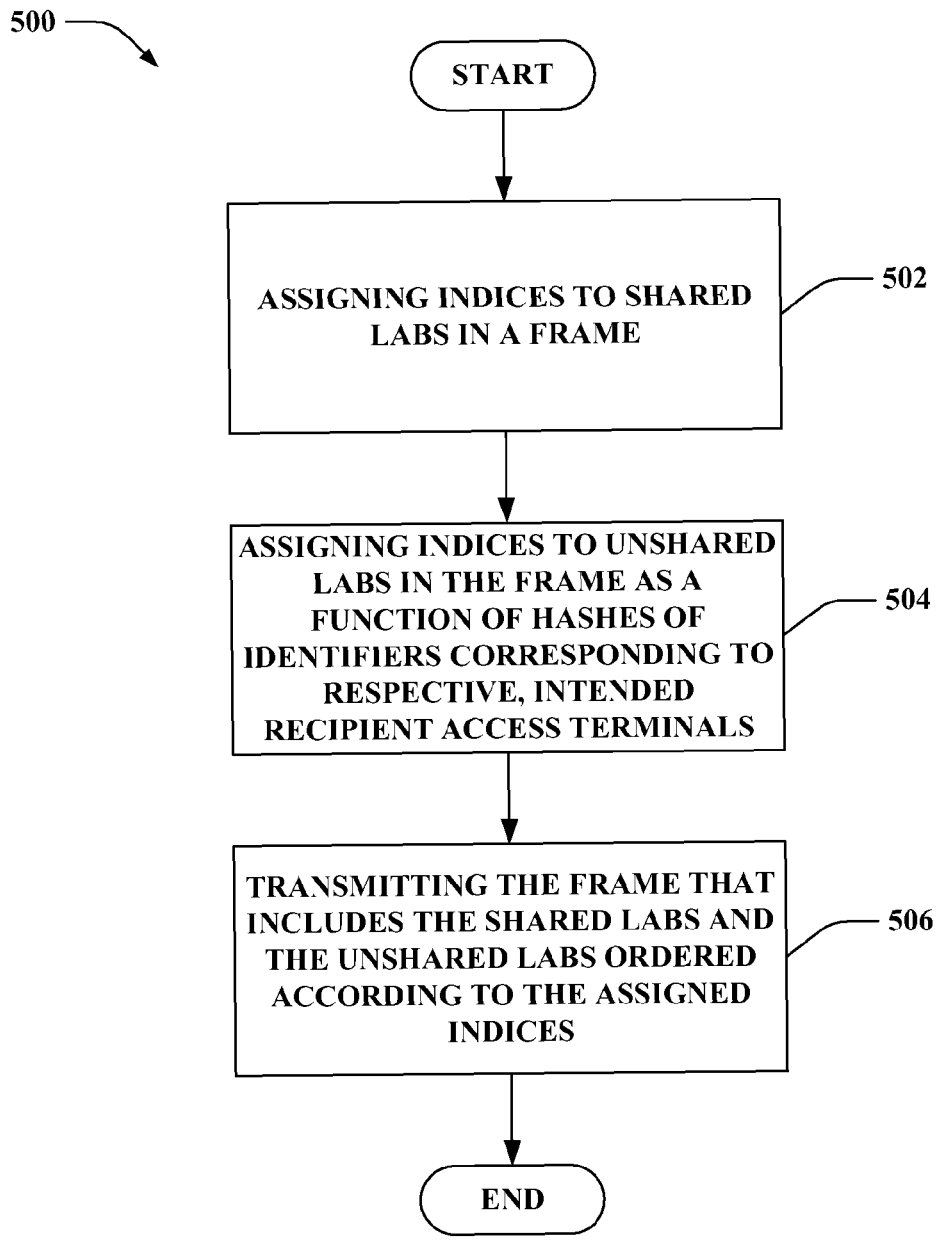
FIG. 5 is an illustration of an example methodology that facilitates sending frames that include shared and unshared link assignment blocks (LABs) in a wireless communication environment.

With reference to FIG. 5, illustrated is a methodology 500 that facilitates sending frames that include shared and unshared link assignment blocks (LABs) in a wireless communication environment. At 502, indices can be assigned to shared LABs in a frame. Shared LABs are intended to be decoded by access terminals in a sector. For instance, shared LABs can be allotted indices from 0 to MaxNumSharedLABs−1. At 504, indices can be assigned to unshared LABs in the frame as a function of hashes of identifiers corresponding to respective, intended recipient access terminals. An unshared LAB (e.g., individual LAB, . . . ) is a LAB directed to a particular recipient access terminal (rather than a group of intended recipient access terminals). According to an illustration, the identifier can be a MACID. Further, the indices can be assigned to the unshared LABs based upon access terminal capabilities (e.g., number of unshared LABs that can be decoded by each access terminal in a given frame, MaxNumIndivLABDec, . . . ). By way of another example, hashes of identifiers can be adjusted to optimize index assignment for the unshared LABs; namely, the index assignment can be altered based upon the adjusted hashes to minimize a number of LAB segments upon which unshared LABs directed to a common access terminal are communicated. At 506, the frame that includes the shared LABs and the unshared LABs ordered according to the assigned indices can be transmitted. For instance, the frame can be communicated via a forward link Shared Control Channel (F-SCCH); however, the claimed subject matter is not so limited. Moreover, the shared LABs and/or the unshared LABs can provide assignment related information (e.g., related to bandwidths to be utilized, packet formats to employ with such bandwidths, . . . ) to recipient access terminals. Thus, forward link and/or reverse link communication can be effectuated based upon the transmitted shared LABs and unshared LABs.

Figure 6:
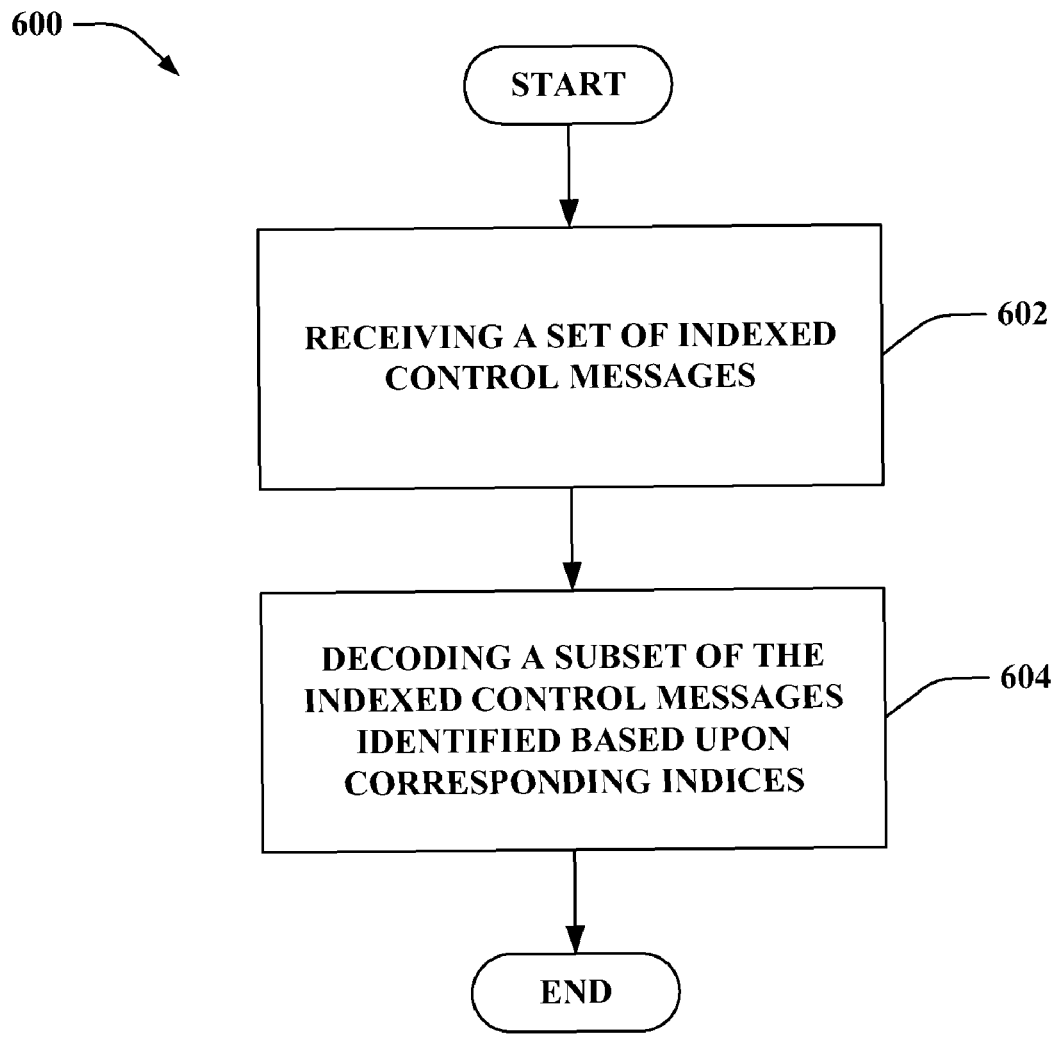
FIG. 6 is an illustration of an example methodology that facilitates decoding a subset of control messages in a wireless communication environment.

Referring to FIG. 6, illustrated is a methodology 600 that facilitates decoding a subset of control messages in a wireless communication environment. At 602, a set of indexed control messages can be received. The control messages, for instance, can be link assignment blocks (LABs). Moreover, shared LABs and/or unshared LABs can be obtained. At 604, a subset of the indexed control messages identified based upon corresponding indices can be decoded. The corresponding indices can be determined based upon a hash of an identifier of a recipient access terminal and/or capabilities of the recipient access terminal. Moreover, the subset of decoded control messages can be restricted to a subset of time-frequency resource groups (e.g., tiles) allocated to the set of indexed control messages.

Figure 7:
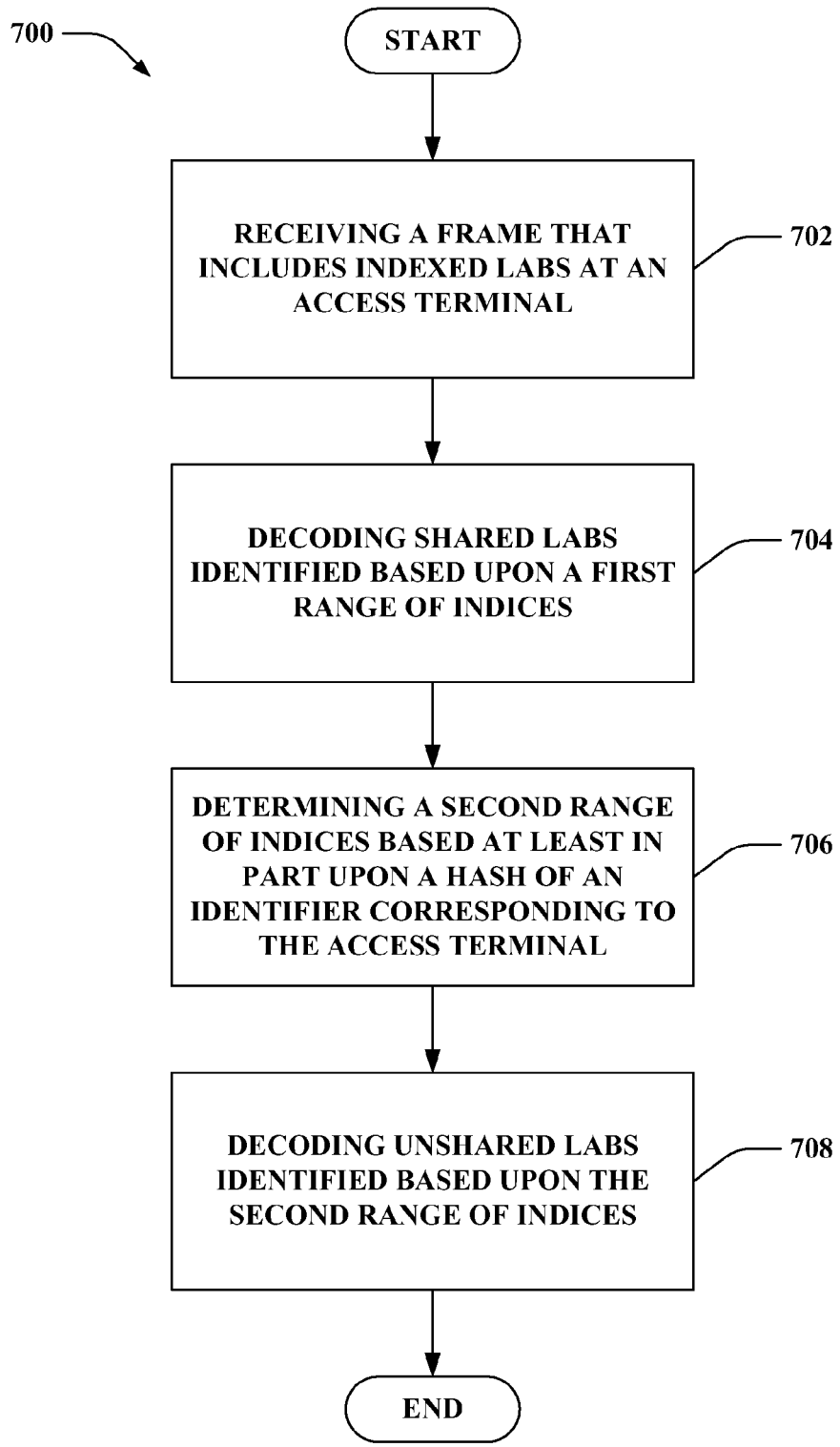
FIG. 7 is an illustration of an example methodology that facilitates decoding a subset of link assignment blocks (LABs) in a wireless communication environment.

Now turning to FIG. 7, illustrated is a methodology 700 that facilitates decoding a subset of link assignment blocks (LABs) in a wireless communication environment. At 702, a frame that includes indexed LABs can be received at an access terminal. The indexed LABs can include shared LABs and unshared LABs (e.g., individual LABs, . . . ). Moreover, indices associated with each of the LABs in the frame can be discerned (e.g., the LABs can be indexed by f=0, . . . , MaxNumLABs−1). At 704, shared LABs identified based upon a first range of indices can be decoded. The shared LABs can be decoded by the access terminal as well as other access terminals in a common sector. Further, the first range of indices can be from 0 to a maximum number of shared LABs minus 1 (e.g., 0, . . . , MaxNumSharedLABs−1). At 706, a second range of indices can be determined based at least in part upon a hash of an identifier corresponding to the access terminal. The second range of indices can include fewer than all indices corresponding to unshared LABs in the frame. The identifier can be, for example, a MACID of the access terminal. Moreover, the second range of indices can be generated based upon capabilities of the access terminal (e.g., number of unshared LABs that can be decoded by the access terminal in a given frame, MaxNumIndivLABDec, . . . ). Accordingly, the second range of indices can be MaxNumSharedLABs+$f_{HASH}$(MACID), . . . , MaxNumSharedLABs+($f_{HASH}$(MACID)+MaxNumIndividLABDec−1) mod (MaxNumLABs−MaxNumSharedLABs). By way of another illustration, the hash of the identifier can be adjusted to manipulate the second range of indices. Following this illustration, the manipulation of the second range of indices can enable unshared LABs to be obtained upon a minimized number of LAB segments (e.g., one LAB segment, two LAB segments, . . . ), where a LAB segment is an OFDM resource. At 708, unshared LABs identified based upon the second range of indices can be decoded. For example, upon being decoded, an identifier incorporated in an unshared LAB (e.g., indicating an intended recipient access terminal) can be recognized and compared to the identifier corresponding to the access terminal. If the identifiers match, then the access terminal can employ the contents of the LAB; otherwise, the access terminal can ignore the contents of the LAB.

It will be appreciated that, in accordance with one or more aspects described herein, inferences can be made regarding employing indices for communicating LABs. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting indices to assign to LABs. By way of further illustration, an inference can be made related to determining how to optimize LABs intended for particular recipients within LAB segments. It will be appreciated that the foregoing examples are illustrative in nature and are not intended to limit the number of inferences that can be made or the manner in which such inferences are made in conjunction with the various embodiments and/or methods described herein.

Figure 8:
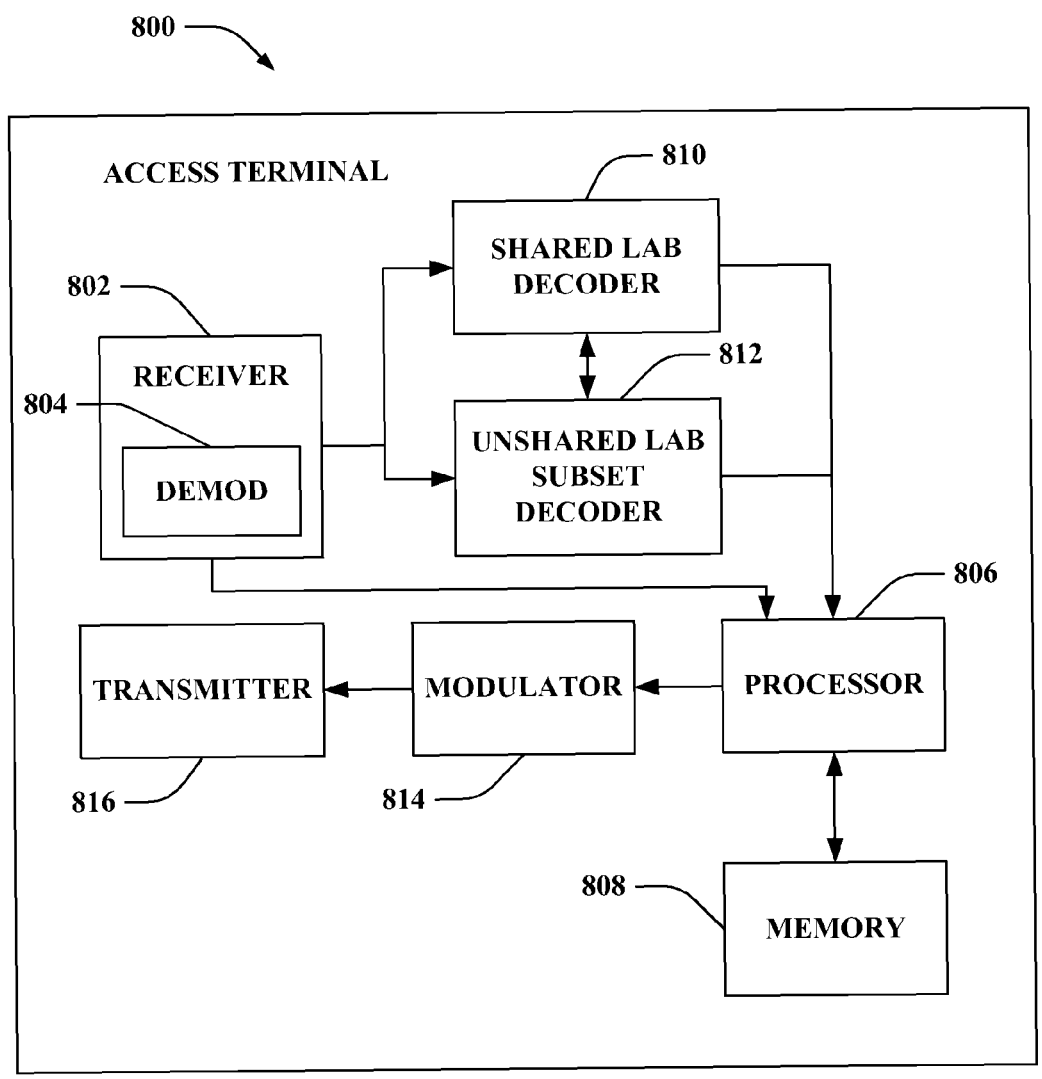
FIG. 8 is an illustration of an example access terminal that facilitates utilizing indexed link assignment blocks (LABs) in a wireless communication system.

FIG. 8 is an illustration of an access terminal 800 that facilitates utilizing indexed link assignment blocks (LABs) in a wireless communication system. Access terminal 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of access terminal 800, and/or a processor that both analyzes information received by receiver 802, generates information for transmission by transmitter 816, and controls one or more components of access terminal 800.

Access terminal 800 can additionally comprise memory 808 that is operatively coupled to processor 806 and that can store data to be transmitted, received data, identifier(s) assigned to access terminal 800, information related to obtained LABs, and any other suitable information for selecting whether to decode obtained LABs. Memory 808 can additionally store protocols and/or algorithms associated with deciphering whether to decode LABs and/or utilize content of decoded LABs.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a shared LAB decoder 810 that decodes shared LABs obtained by receiver 802. Shared LAB decoder 810 can identify whether a LAB included in a received frame is a shared LAB. For instance, shared LAB decoder 810 can analyze an index associated with the LAB to decipher whether the LAB is a shared LAB. Further, shared LAB decoder 810 can employ decoded data included in the shared LAB. Additionally, receiver 802 can be operatively coupled to an unshared LAB subset decoder 812 that decodes unshared LABs obtained by receiver 802. Unshared LAB subset decoder 812 can determine a subset of indices that correspond to access terminal 800 based upon a hash function of an identifier related to access terminal 800 and/or capabilities of access terminal 800. Further, unshared LAB subset decoder 812 can decode LABs (e.g., unshared LABs, individual LABs, . . . ) that correspond to the subset of indices. Moreover, unshared LAB subset decoder 812 can analyze content of each decoded LAB to determine whether access terminal 800 is the intended recipient (e.g., by evaluating an identifier scrambled in the LAB, . . . ). Access terminal 800 still further comprises a modulator 814 and a transmitter 816 that transmits the signal to, for instance, a base station, another access terminal, etc. Although depicted as being separate from the processor 806, it is to be appreciated that shared LAB decoder 810, unshared LAB subset decoder 812 and/or modulator 814 can be part of processor 806 or a number of processors (not shown).

Figure 9:
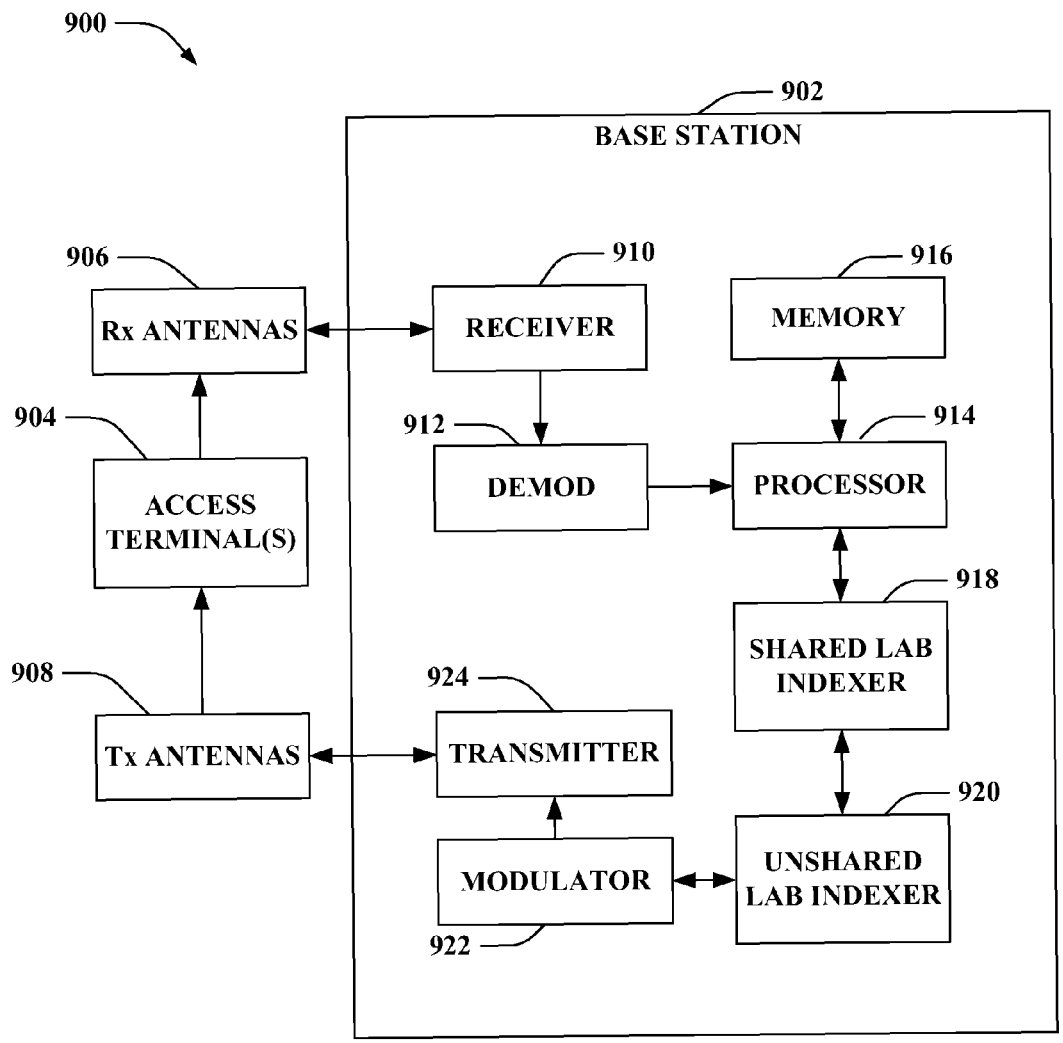
FIG. 9 is an illustration of an example system that facilitates indexing link assignment blocks (LABs) in a wireless communication environment.

FIG. 9 is an illustration of a system 900 that facilitates indexing link assignment blocks (LABs) in a wireless communication environment. System 900 comprises a base station 902 (e.g., access point, . . . ) with a receiver 910 that receives signal(s) from one or more access terminals 904 through a plurality of receive antennas 906, and a transmitter 922 that transmits to the one or more access terminals 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores information related to access terminal identifiers (e.g., MACIDs, . . . ), data to be transmitted to or received from access terminal(s) 904 (or a disparate base station (not shown)) (e.g., LABs, . . . ), and/or any other suitable information related to performing the various actions and functions set forth herein. Processor 914 is further coupled to a shared LAB indexer 918 that assigns indices to a first subset of LABs (e.g., shared LABs) from a frame, where LABs in the first subset are intended to be shared amongst a plurality of access terminals 904.

Shared LAB indexer 818 can be operatively coupled to an unshared LAB indexer 920 that assigns indices to LABs (e.g., unshared LABs, individual LABs, . . . ) in a second subset. Moreover, unshared LAB indexer 920 can base an index assignment upon a hash of an identifier (e.g., MACID, . . . ) corresponding to an intended recipient access terminal from a plurality of access terminals 904. Further, unshared LAB indexer 920 can consider capabilities of the intended recipient access terminal when allotting the index. Further, unshared LAB indexer 920 (and/or shared LAB indexer 818) can provide a frame of LABs ordering according to corresponding indices to a modulator 922. Modulator 922 can multiplex the frame for transmission by a transmitter 926 through antenna 908 to access terminal(s) 904. Although depicted as being separate from the processor 914, it is to be appreciated that shared LAB indexer 918, unshared LAB indexer 920 and/or modulator 922 can be part of processor 914 or a number of processors (not shown).

Figure 10:
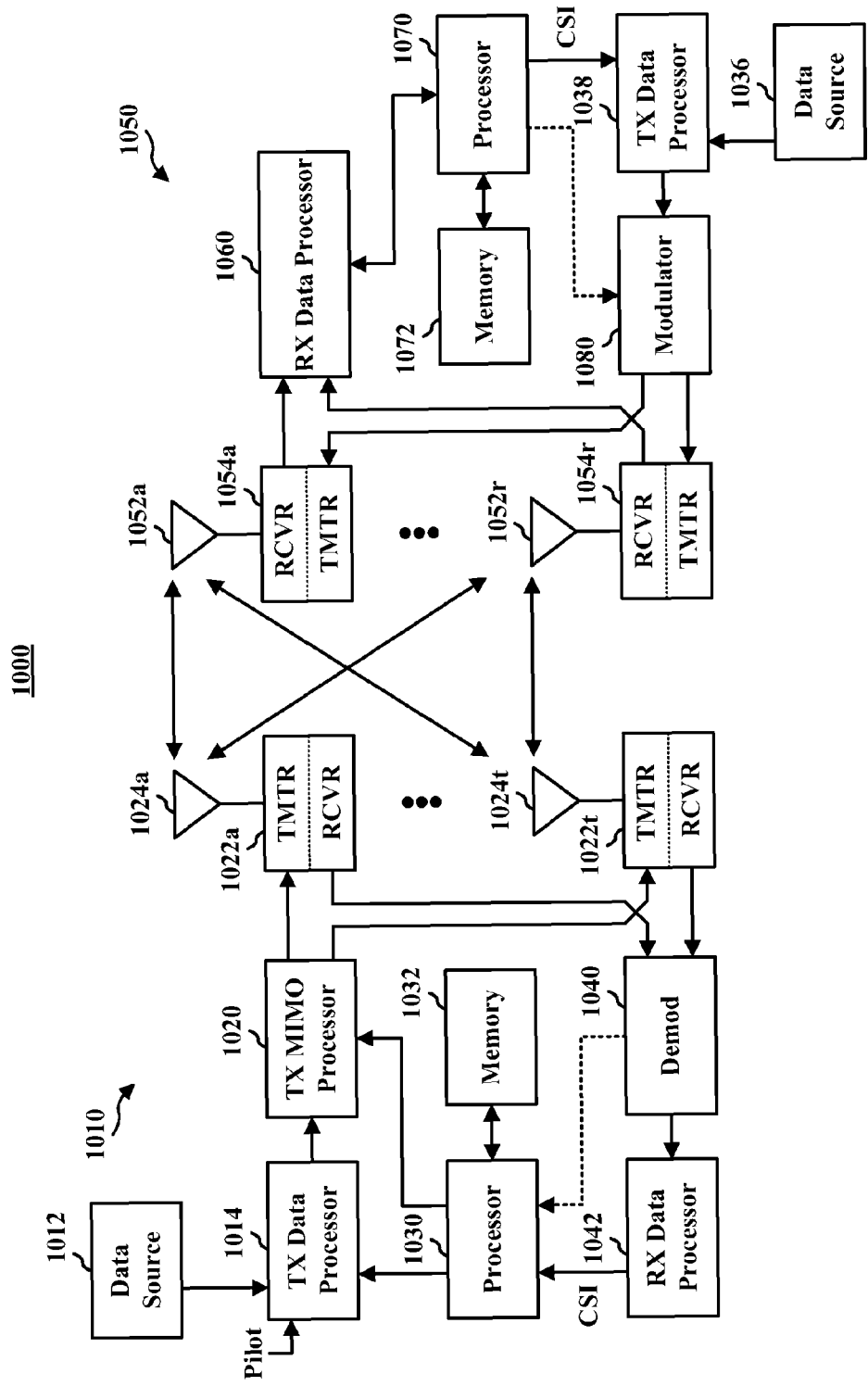
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems (FIGS. 1-3, 8-9, and 11-12) and/or methods (FIGS. 4-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which precoding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
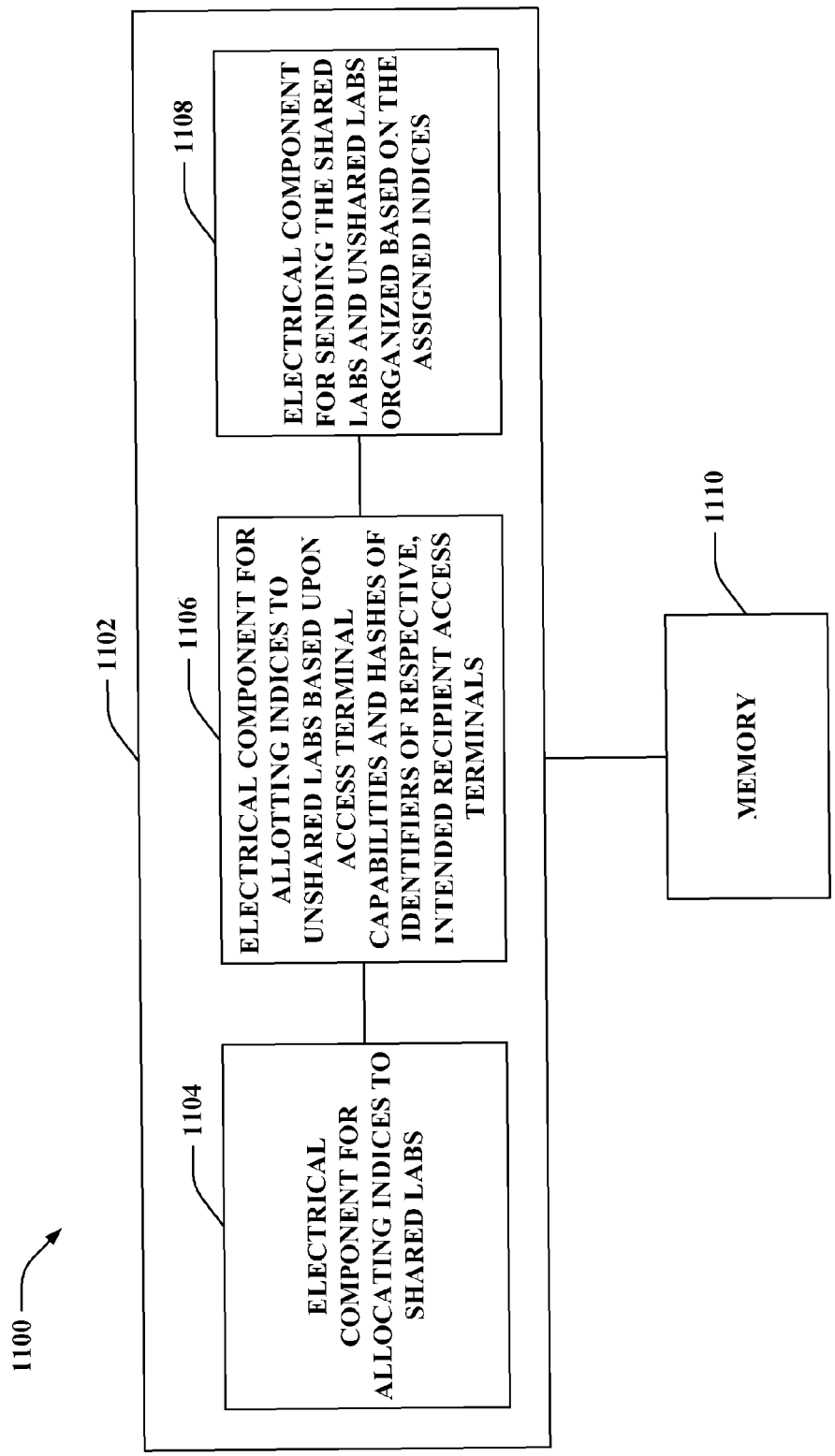
FIG. 11 is an illustration of an example system that enables assigning indices to link assignment blocks (LABs) and organizing LABs based thereupon in a wireless communication environment.

With reference to FIG. 11, illustrated is a system 1100 that enables assigning indices to link assignment blocks (LABs) and organizing LABs based thereupon in a wireless communication environment. For example, system 1100 can reside at least partially within a base station. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for allocating indices to shared LABs 1104. Further, logical grouping 1102 can comprise an electrical component for allotting indices to unshared LABs based upon access terminal capabilities and hashes of identifiers of respective, intended recipient access terminals 1106. Moreover, logical grouping 1102 can include an electrical component for sending the shared LABs and unshared LABs organized based on the assigned indices 1108. For example, the shared LABs and unshared LABs can be organized within a frame. Additionally, system 1100 can include a memory 1110 that retains instructions for executing functions associated with electrical components 1104, 1106, and 1108. While shown as being external to memory 1110, it is to be understood that one or more of electrical components 1104, 1106, and 1108 can exist within memory 1110.

Figure 12:
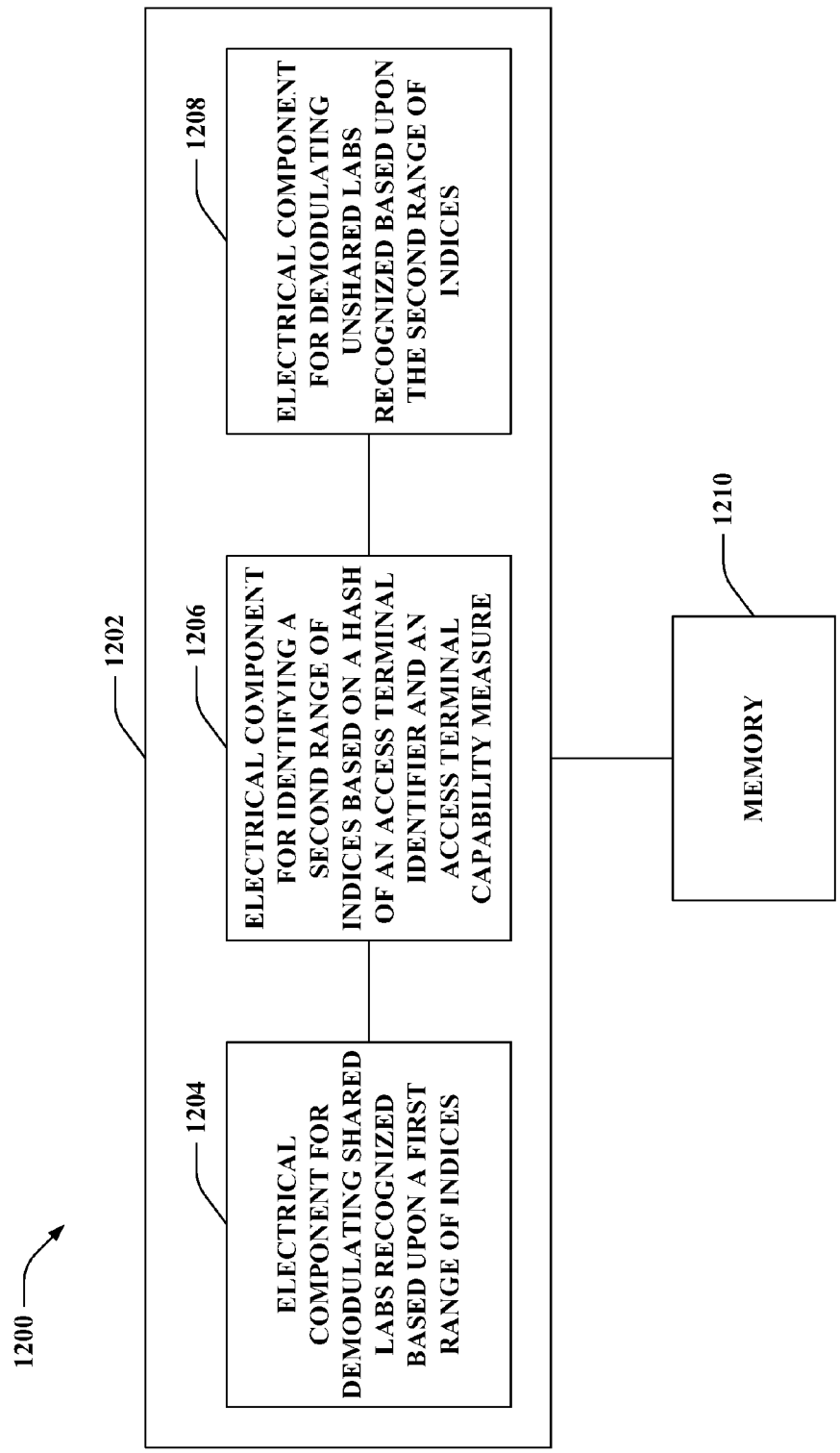
FIG. 12 is an illustration of an example system that enables decoding a subset of received link assignment blocks (LABs) in a wireless communication environment.

Turning to FIG. 12, illustrated is a system 1200 that enables decoding a subset of received link assignment blocks (LABs) in a wireless communication environment. System 1200 can reside within an access terminal, for instance. As depicted, system 1200 includes functional blocks that can represent functions implemented by a processor, software, or combination thereof (e.g., firmware). System 1200 includes a logical grouping 1202 of electrical components that can act in conjunction. Logical grouping 1202 can include an electrical component for demodulating shared LABs recognized based upon a first range of indices 1204. Moreover, logical grouping 1202 can include an electrical component for identifying a second range of indices based on a hash of an access terminal identifier and an access terminal capability measure 1206. For instance, the access terminal identifier can be a MACID corresponding to the access terminal and the access terminal capability measure can be a number of unshared LABs that the access terminal can demodulate. Further, logical grouping 1202 can include an electrical component for demodulating unshared LABs recognized based upon the second range of indices 1208. Additionally, system 1200 can include a memory 1210 that retains instructions for executing functions associated with electrical components 1204, 1206, and 1208. While shown as being external to memory 1210, it is to be understood that electrical components 1204, 1206, and 1208 can exist within memory 1210.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates sending frames that include control messages in a wireless communication environment, comprising:
   assigning indices to a set of control messages; and
   restricting transmission of respective subsets of the control messages to respective, intended recipient access terminals based on the indices.

2. The method of claim 1, further comprising restricting each of the respective subsets of control messages to a corresponding subset of time-frequency resource groups allocated to the set of control messages.

3. The method of claim 1, wherein the control messages include shared and unshared link assignment blocks (LABs), further comprising:
   assigning indices to shared LABs in a frame;
   assigning indices to unshared LABs in the frame as a function of hashes of identifiers corresponding to the respective, intended recipient access terminals; and
   transmitting the frame that includes the shared LABs and the unshared LABs ordered according to the assigned indices.

4. The method of claim 3, wherein the indices assigned to the shared LABs are in a subset from 0 to MaxNumSharedLABs−1, where MaxNumSharedLABs denotes a maximum number of LABs decoded by multiple access terminals.

5. The method of claim 3, further comprising assigning the indices to the unshared LABs in the frame based upon access terminal capabilities and the hashes of the identifiers.

6. The method of claim 5, wherein the identifiers are MAC-IDs corresponding to the respective, intended recipient access terminals.

7. The method of claim 6, wherein the indices assigned to the unshared LABs are in a subset from MaxNumSharedLABs+$f_{HASH}$(MACID) to MaxNumSharedLABs+($f_{HASH}$(MACID)+MaxNumIndivLABDec−1)mod(MaxNumLABs−MaxNumSharedLABs), where MaxNumSharedLABs denotes a maximum number of LABs decoded by multiple access terminals, MaxNumIndivLABDec denotes a maximum number of unshared LABs that one access terminal decodes, and MaxNumLABs denotes a maximum number of LABs transmitted in one physical (PHY) frame.

8. The method of claim 3, further comprising adjusting the hashes of the identifiers to optimize index assignment for the unshared LABs by minimizing a number of LAB segments upon which the unshared LABs directed to a common access terminal are communicated.

9. The method of claim 3, further comprising transmitting the frame via a forward link Shared Control Channel (F-SCCH).

10. The method of claim 3, wherein the shared LABs and the unshared LABs provide assignment related information pertaining to at least one of bandwidths or packet formats.

11. A wireless communications apparatus, comprising:
    a memory that retains instructions related to assigning indices to a set of control messages and restricting transmission of respective subsets of the control messages to respective, intended recipient access terminals based on the indices; and
    a processor, coupled to the memory, configured to execute the instructions retained in the memory.

12. The wireless communications apparatus of claim 11, wherein the memory further retains instructions related to restricting each of the respective subsets of control messages to a corresponding subset of time-frequency resource groups allocated to the set of control messages.

13. The wireless communications apparatus of claim 11, wherein the control messages include shared and unshared link assignment blocks (LABs), and the memory further retains instructions related to allocating indices to shared LABs in a physical frame, allocating indices to individual LABs in the physical frame as a function of hashes of MAC-IDs corresponding to the respective, intended recipient access terminals, and transmitting the physical frame that includes the shared LABs and the individual LABs ordered according to the allocated indices.

14. The wireless communications apparatus of claim 13, wherein the indices allocated to the shared LABs are in a subset from 0 to MaxNumSharedLABs−1, where MaxNumSharedLABs denotes a maximum number of LABs decoded by multiple access terminals.

15. The wireless communications apparatus of claim 13, wherein the memory further retains instructions related to allocating the indices to the individual LABs in the physical frame based upon access terminal capabilities and the hashes of the MACIDs.

16. The wireless communications apparatus of claim 15, wherein the indices allocated to the individual LABs are in a subset from MaxNumSharedLABs+$f_{HASH}$(MACID) to MaxNumSharedLABs+($f_{HASH}$(MACID)+MaxNumIndivLAB- Dec−1)mod(MaxNumLABs−MaxNumSharedLABs), where MaxNumSharedLABs denotes a maximum number of LABs decoded by multiple access terminals, MaxNumIndivLABDec denotes a maximum number of unshared LABs that one access terminal decodes, and MaxNumLABs denotes a maximum number of LABs transmitted in one physical frame.

17. The wireless communications apparatus of claim 13, wherein the memory further retains instructions related to adjusting the hashes of the MACIDs to optimize index allocation for the individual LABs by minimizing a number of LAB segments upon which individual LABs directed to a common access terminal are communicated.

18. The wireless communications apparatus of claim 13, wherein the shared LABs and the individual LABs provide assignment related information pertaining to at least one of bandwidths or packet formats.

19. A wireless communications apparatus that enables assigning indices to link assignment blocks (LABs) and organizing LABs based thereupon in a wireless communication environment, comprising:
    means for allocating indices to shared LABs;
    means for allotting indices to unshared LABs based upon access terminal capabilities and hashes of identifiers of respective, intended recipient access terminals; and
    means for sending the shared LABs and the unshared LABs organized based on the assigned indices.

20. The wireless communications apparatus of claim 19, further comprising means for restricting transfer of subsets of shared LABs and unshared LABs to respective, corresponding subsets of time-frequency resource groups.

21. The wireless communications apparatus of claim 19, wherein the indices allocated to the shared LABs are in a subset from 0 to MaxNumSharedLABs−1, where MaxNumSharedLABs denotes a maximum number of LABs decoded by multiple access terminals.

22. The wireless communications apparatus of claim 19, wherein the identifiers are MACIDs of the respective, intended recipient access terminals.

23. The wireless communications apparatus of claim 22, wherein the indices allotted to the unshared LABs are in a subset from MaxNumSharedLABs+$f_{HASH}$(MACID) to MaxNumSharedLABs+($f_{HASH}$(MACID)+MaxNumIndivLABDec−1)mod(MaxNumLABs−MaxNumSharedLABs), where MaxNumSharedLABs denotes a maximum number of LABs decoded by multiple access terminals, MaxNumIndivLABDec denotes a maximum number of unshared LABs that one access terminal decodes, and MaxNumLABs denotes a maximum number of LABs transmitted in one physical frame.

24. The wireless communications apparatus of claim 19, further comprising means for altering the hashes of the identifiers to optimize index allocation for the unshared LABs by minimizing a number of LAB segments upon which unshared LABs directed to a common access terminal are communicated.

25. The wireless communications apparatus of claim 19, wherein the shared LABs and the unshared LABs provide assignment related information.

26. A non-transitory machine-readable medium having stored thereon machine-executable instructions for:
    assigning indices to a set of control messages; and
    restricting transmission of respective subsets of the control messages to respective, intended recipient access terminals based on the indices.

27. The machine-readable medium of claim 26, wherein the machine-executable instructions further comprise restricting each of the respective subsets of control messages to a corresponding subset of time-frequency resource groups allocated to the set of control messages.

28. The machine-readable medium of claim 26, wherein the control messages include shared and unshared link assignment blocks (LABs).

29. The machine-readable medium of claim 28, wherein the machine-executable instructions further comprise:
    assigning indices to shared LABs in a frame;
    assigning indices to unshared LABS in the frame based upon access terminal capabilities and hashes of identifiers of the respective, intended recipient access terminals; and
    arranging the shared LABs and the unshared LABs in the frame based upon the indices; and
    sending the frame with the arranged shared LABs and the unshared LABs.

30. The machine-readable medium of claim 29, wherein the indices assigned to the shared LABs are in a subset from 0 to MaxNumSharedLABs−1, where MaxNumSharedLABs denotes a maximum number of LABs decoded by multiple access terminals.

31. The machine-readable medium of claim 29, wherein identifiers are MACIDs of the respective, intended recipient access terminals.

32. The machine-readable medium of claim 31, wherein the indices assigned to the unshared LABs are in a subset from MaxNumSharedLABs+$f_{HASH}$(MACID) to MaxNumSharedLABs+($f_{HASH}$(MACID)+MaxNumIndivLABDec−1)mod(MaxNumLABs−MaxNumSharedLABs), where MaxNumSharedLABs denotes a maximum number of LABs decoded by multiple access terminals, MaxNumIndivLABDec denotes a maximum number of unshared LABs that one access terminal decodes, and MaxNumLABs denotes a maximum number of LABs transmitted in one physical frame.

33. The machine-readable medium of claim 29, wherein the machine-executable instructions further comprise altering the hashes of the identifiers to optimize index allocation for the unshared LABs by minimizing a number of LAB segments upon which the unshared LABs directed to a common access terminal are communicated.

34. In a wireless communications system, an apparatus comprising:
    a processor configured to:
        assign indices to a set of control messages; and
        restrict transmission of respective subsets of the control messages to respective, intended recipient access terminals based on the indices.

35. A method that facilitates decoding a subset of control messages in a wireless communication environment, comprising:
    receiving a set of indexed control messages; and
    decoding a subset of the indexed control messages identified based upon corresponding indices.

36. The method of claim 35, wherein the subset of decoded control messages are restricted to a subset of time-frequency resource groups allocated to the set of control messages.

37. The method of claim 35, wherein the control messages include shared and unshared link assignment blocks (LABs), further comprising:
    receiving a frame that includes indexed LABs at an access terminal;
    decoding shared LABs identified based upon a first range of indices;
    determining a second range of indices based at least in part upon a hash of an identifier corresponding to the access terminal; and decoding unshared LABs identified based upon the second range of indices.

38. The method of claim 37, wherein the first range of indices is from 0 to MaxNumSharedLABs−1, where MaxNumSharedLABs denotes a maximum number of LABs decoded by multiple access terminals.

39. The method of claim 37, wherein the identifier is a MACID of the access terminal.

40. The method of claim 39, further comprising determining the second range of indices based upon capabilities of the access terminal and the hash of the MACID.

41. The method of claim 40, wherein the second range of indices includes fewer than all indices corresponding to the unshared LABs in the frame sent by a base station.

42. The method of claim 40, wherein the second range of indices is from MaxNumSharedLABs+$f_{HASH}$(MACID) to MaxNumSharedLABs+($f_{HASH}$(MACID)+MaxNumIndivLABDec−1)mod(MaxNumLABs−MaxNumSharedLABs), where MaxNumSharedLABs denotes a maximum number of LABs decoded by multiple access terminals, MaxNumIndivLABDec denotes a maximum number of unshared LABs that the access terminal decodes, and MaxNumLABs denotes a maximum number of LABs transmitted in one physical frame.

43. The method of claim 37, further comprising adjusting the hash of the identifier to manipulate the second range of indices to enable the unshared LABs to be obtained upon a minimized number of LAB segments, where a LAB segment is an OFDM resource.

44. The method of claim 37, further comprising evaluating identifiers incorporated in the unshared LABs to recognize whether the access terminal is an intended recipient for each of the unshared LABs.

45. A wireless communications apparatus, comprising:
a memory that retains instructions related to obtaining a set of indexed control messages and decoding a subset of the indexed control messages identified based upon corresponding indices; and
a processor, coupled to the memory, configured to execute the instructions retained in the memory.

46. The wireless communications apparatus of claim 45, wherein the subset of decoded control messages are restricted to a subset of time-frequency resource groups allocated to the set of control messages.

47. The wireless communications apparatus of claim 45, wherein the control messages include shared and unshared link assignment blocks (LABs), and the memory further retains instructions related to obtaining a frame that includes LABs, decoding shared LABs recognized based upon a first range of indices, deciphering a second range of indices as a function of a hash of a MACID corresponding to an access terminal, and decoding unshared LABs recognized based upon the second range of indices.

48. The wireless communications apparatus of claim 47, wherein the first range of indices is from 0 to MaxNumSharedLABs−1, where MaxNumSharedLABs denotes a maximum number of LABs decoded by multiple access terminals.

49. The wireless communications apparatus of claim 47, wherein the memory further retains instructions related to deciphering the second range of indices based upon a capability measure of the access terminal and the hash of the MACID.

50. The wireless communications apparatus of claim 49, wherein the second range of indices is from MaxNumSharedLABs+$f_{HASH}$(MACID) to MaxNumSharedLABs+($f_{HASH}$(MACID)+MaxNumIndivLABDec−1)mod(MaxNumLABs−MaxNumSharedLABs), where MaxNumSharedLABs denotes a maximum number of LABs decoded by multiple access terminals, MaxNumIndivLABDec denotes a maximum number of unshared LABs that the access terminal decodes, and MaxNumLABs denotes a maximum number of LABs transmitted in one physical frame.

51. The wireless communications apparatus of claim 47, wherein the second range of indices includes fewer than all indices corresponding to the unshared LABs in the frame.

52. The wireless communications apparatus of claim 47, wherein the memory further retains instructions related to adjusting the hash of the MACID to manipulate the second range of indices to enable the unshared LABs to be obtained upon a minimized number of LAB segments, where a LAB segment is an OFDM resource.

53. The wireless communications apparatus of claim 47, wherein the memory further retains instructions related to comparing MACIDs encoded in the unshared LABs to the MACID of the access terminal to recognize whether the access terminal is an intended recipient for each of the unshared LABs.

54. A wireless communications apparatus that enables decoding a subset of received link assignment blocks (LABs) in a wireless communication environment, comprising:
means for demodulating shared LABs recognized based upon a first range of indices;
means for identifying a second range of indices based on a hash of an access terminal identifier and an access terminal capability measure; and
means for demodulating unshared LABs recognized based upon the second range of indices.

55. The wireless communications apparatus of claim 54, wherein the demodulated unshared LABs are restricted to a subset of time-frequency resource groups.

56. The wireless communications apparatus of claim 54, wherein the first range of indices is from 0 to MaxNumSharedLABs−1, where MaxNumSharedLABs denotes a maximum number of LABs demodulated by multiple access terminals.

57. The wireless communications apparatus of claim 54, wherein the access terminal identifier is a MACID and the second range of indices is from MaxNumSharedLABs+$f_{HASH}$(MACID) to MaxNumSharedLABs+($f_{HASH}$(MACID)+MaxNumIndivLABDec−1)mod(MaxNumLABs−MaxNumSharedLABs), where MaxNumSharedLABs denotes a maximum number of LABs demodulated by multiple access terminals, MaxNumIndivLABDec denotes a maximum number of unshared LABs that the access terminal demodulates, and MaxNumLABs denotes a maximum number of LABs transmitted in one physical frame.

58. The wireless communications apparatus of claim 54, wherein the second range of indices includes less than a total number of indices corresponding to the unshared LABs in the frame.

59. The wireless communications apparatus of claim 54, further comprising means for adjusting the hash of the access terminal identifier to manipulate the second range of indices to enable the unshared LABs to be obtained upon a minimized number of LAB segments, where a LAB segment is an OFDM resource.

60. The wireless communications apparatus of claim 54, further comprising means for comparing identifiers encoded in the unshared LABs to the access terminal identifier to recognize whether the access terminal is an intended recipient for each of the unshared LABs.

61. A non-transitory machine-readable medium having stored thereon machine-executable instructions for:
    receiving a set of indexed control messages; and
    decoding a subset of the indexed control messages identified based upon corresponding indices.

62. The machine-readable medium of claim 61, wherein the subset of decoded control messages are restricted to a subset of time-frequency resource groups allocated to the set of control messages.

63. The machine-readable medium of claim 61, wherein the control messages include shared and unshared link assignment blocks (LABs).

64. The machine-readable medium of claim 63, wherein the machine-executable instructions further comprise:
    obtaining a frame that includes LABs;
    decoding shared LABs recognized based upon a first range of indices;
    deciphering a second range of indices as a function of a hash of a MACID corresponding to an access terminal; and
    decoding unshared LABs recognized based upon the second range of indices.

65. The machine-readable medium of claim 64, wherein the first range of indices is from 0 to MaxNumSharedLABs−1, where MaxNumSharedLABs denotes a maximum number of LABs decoded by multiple access terminals.

66. The machine-readable medium of claim 64, wherein the machine-executable instructions further comprise deciphering the second range of indices based upon a capability measure of the access terminal and the hash of the MACID.

67. The machine-readable medium of claim 66, wherein the second range of indices is from MaxNumSharedLABs+$f_{HASH}$(MACID) to MaxNumSharedLABs+($f_{HASH}$(MACID)+MaxNumIndivLABDec−1)mod(MaxNumLABs−MaxNumSharedLABs), where MaxNumSharedLABs denotes a maximum number of LABs decoded by multiple access terminals, MaxNumIndivLABDec denotes a maximum number of unshared LABs that the access terminal decodes, and MaxNumLABs denotes a maximum number of LABs transmitted in one physical frame.

68. The machine-readable medium of claim 64, wherein the second range of indices includes fewer than all indices corresponding to the unshared LABs in the frame.

69. The machine-readable medium of claim 64, wherein the machine-executable instructions further comprise adjusting the hash of the MACID to manipulate the second range of indices to enable the unshared LABs to be obtained upon a minimized number of LAB segments, where a LAB segment is an OFDM resource.

70. The machine-readable medium of claim 64, wherein the machine-executable instructions further comprise comparing MACIDs encoded in the unshared LABs to the MACID of the access terminal to recognize whether the access terminal is an intended recipient for each of the unshared LABs.

71. In a wireless communications system, an apparatus comprising:
    a processor configured to:
        obtain a set of indexed control messages; and
        decode a subset of the indexed control messages identified based upon corresponding indices.

72. A method for assigning indices to link assignment blocks (LABs) and organizing LABs based thereupon in a wireless communication environment, comprising:
    allocating indices to shared LABs;
    allotting indices to unshared LABs based upon access terminal capabilities and hashes of identifiers of respective, intended recipient access terminals; and
    sending the shared LABs and the unshared LABs organized based on the assigned indices.

73. The method of claim 72, further comprising restricting transfer of subsets of shared LABs and unshared LABs to respective, corresponding subsets of time-frequency resource groups.

74. The method of claim 72, wherein the indices allocated to the shared LABs are in a subset from 0 to MaxNumSharedLABs−1, where MaxNumSharedLABs denotes a maximum number of LABs decoded by multiple access terminals.

75. The method of claim 72, wherein the identifiers are Media Access Control Identifiers (MACIDs) of the respective, intended recipient access terminals.

76. The method of claim 75, wherein the indices allotted to the unshared LABs are in a subset from MaxNumSharedLABs+fHASH(MACID) to MaxNumSharedLABs+(fHASH(MACID)+MaxNumIndivLABDec−1)mod (MaxNumLABs−MaxNumSharedLABs), where MaxNumSharedLABs denotes a maximum number of LABs decoded by multiple access terminals, MaxNumIndivLABDec denotes a maximum number of unshared LABs that one access terminal decodes, and MaxNumLABs denotes a maximum number of LABs transmitted in one physical frame.

77. The method of claim 72, further comprising altering the hashes of the identifiers to optimize index allocation for the unshared LABs by minimizing a number of LAB segments upon which the unshared LABs directed to a common access terminal are communicated.

78. The method of claim 72, wherein the shared LABs and the unshared LABs provide assignment related information.

79. A method for decoding a subset of received link assignment blocks (LABs) in a wireless communication environment, comprising:
    demodulating shared LABs recognized based upon a first range of indices;
    identifying a second range of indices based on a hash of an access terminal identifier and an access terminal capability measure; and
    demodulating unshared LABs recognized based upon the second range of indices.

80. The method of claim 79, wherein the demodulated unshared LABs are restricted to a subset of time-frequency resource groups.

81. The method of claim 79, wherein the first range of indices is from 0 to MaxNumSharedLABs−1, where MaxNumSharedLABs denotes a maximum number of LABs demodulated by multiple access terminals.

82. The method of claim 79, wherein the access terminal identifier is a Media Access Control Identifier (MACID) and the second range of indices is from MaxNumSharedLABs+fHASH(MACID) to MaxNumSharedLABs+(fHASH(MACID)+MaxNumIndivLABDec−1)mod (MaxNumLABs−MaxNumSharedLABs), where MaxNumSharedLABs denotes a maximum number of LABs demodulated by multiple access terminals, MaxNumIndivLABDec denotes a maximum number of unshared LABs that the access terminal demodulates, and MaxNumLABs denotes a maximum number of LABs transmitted in one physical frame.

83. The method of claim 79, wherein the second range of indices includes less than a total number of indices corresponding to the unshared LABs in the frame.

84. The method of claim 79, further comprising adjusting the hash of the access terminal identifier to manipulate the second range of indices to enable the unshared LABs to be obtained upon a minimized number of LAB segments, where a LAB segment is an orthogonal frequency-division multiplexing (OFDM) resource.

85. The method of claim 79, further comprising comparing identifiers encoded in the unshared LABs to the access terminal identifier to recognize whether the access terminal is an intended recipient for each of the unshared LABs.

86. An apparatus to assign indices to link assignment blocks (LABs) and organizing LABs based thereupon in a wireless communication environment, comprising:
a processor configured to:
allocate indices to shared LABs;
allot indices to unshared LABs based upon access terminal capabilities and hashes of identifiers of respective, intended recipient access terminals; and
send the shared LABs and the unshared LABs organized based on the assigned indices; and
a memory operably connected to said processor.

87. The apparatus of claim 86, further comprising restricting transfer of subsets of shared LABs and unshared LABs to respective, corresponding subsets of time-frequency resource groups.

88. The apparatus of claim 86, wherein the indices allocated to the shared LABs are in a subset from 0 to MaxNumSharedLABs−1, where MaxNumSharedLABs denotes a maximum number of LABs decoded by multiple access terminals.

89. The apparatus of claim 86, wherein the identifiers are Media Access Control Identifiers (MACIDs) of the respective, intended recipient access terminals.

90. The apparatus of claim 89, wherein the indices allotted to the unshared LABs are in a subset from MaxNumSharedLABs+fHASH(MACID) to MaxNumSharedLABs+(fHASH(MACID)+MaxNumIndivLABDec−1)mod (MaxNumLABs−MaxNumSharedLABs), where MaxNumSharedLABs denotes a maximum number of LABs decoded by multiple access terminals, MaxNumIndivLABDec denotes a maximum number of unshared LABs that one access terminal decodes, and MaxNumLABs denotes a maximum number of LABs transmitted in one physical frame.

91. The apparatus of claim 86, wherein the processor is further configured to alter the hashes of the identifiers to optimize index allocation for the unshared LABs by minimizing a number of LAB segments upon which the unshared LABs directed to a common access terminal are communicated.

92. The apparatus of claim 86, wherein the shared LABs and the unshared LABs provide assignment related information.

93. An apparatus to decode a subset of received link assignment blocks (LABs) in a wireless communication environment, comprising:
a processor configured to:
demodulate shared LABs recognized based upon a first range of indices;
identify a second range of indices based on a hash of an access terminal identifier and an access terminal capability measure; and
demodulate unshared LABs recognized based upon the second range of indices; and
a memory operably connected to said processor.

94. The apparatus of claim 93, wherein the demodulated unshared LABs are restricted to a subset of time-frequency resource groups.

95. The apparatus of claim 93, wherein the first range of indices is from 0 to MaxNumSharedLABs−1, where MaxNumSharedLABs denotes a maximum number of LABs demodulated by multiple access terminals.

96. The apparatus of claim 93, wherein the access terminal identifier is a Media Access Control Identifier (MACID) and the second range of indices is from MaxNumSharedLABs+fHASH(MACID) to MaxNumSharedLABs+(fHASH(MACID)+MaxNumIndivLABDec−1)mod(MaxNumLABs−MaxNumSharedLABs), where MaxNumSharedLABs denotes a maximum number of LABs demodulated by multiple access terminals, MaxNumIndivLABDec denotes a maximum number of unshared LABs that the access terminal demodulates, and MaxNumLABs denotes a maximum number of LABs transmitted in one physical frame.

97. The apparatus of claim 93, wherein the second range of indices includes less than a total number of indices corresponding to the unshared LABs in the frame.

98. The apparatus of claim 93, wherein the processor is further configured to adjust the hash of the access terminal identifier to manipulate the second range of indices to enable the unshared LABs to be obtained upon a minimized number of LAB segments, where a LAB segment is an orthogonal frequency-division multiplexing (OFDM) resource.

99. The wireless communications apparatus of claim 93, wherein the processor is further configured to compare identifiers encoded in the unshared LABs to the access terminal identifier to recognize whether the access terminal is an intended recipient for each of the unshared LABs.

100. A wireless communications apparatus for assigning indices to link assignment blocks (LABs) and organizing LABs based thereupon in a wireless communication environment, comprising:
means for allocating indices to shared LABs;
means for allotting indices to unshared LABs based upon hashes of identifiers of respective, intended recipient access terminals; and
means for sending the shared LABs and the unshared LABs organized based on the assigned indices.

101. A wireless communications apparatus for assigning indices to link assignment blocks (LABs) and organizing LABs based thereupon in a wireless communication environment, comprising:
means for allocating indices to shared LABs;
means for allotting indices to unshared LABs based upon access terminal capabilities; and
means for sending the shared LABs and the unshared LABs organized based on the assigned indices.

102. A method for assigning indices to link assignment blocks (LABs) and organizing LABs based thereupon in a wireless communication environment, comprising:
allocating indices to shared LABs;
allotting indices to unshared LABs based upon hashes of identifiers of respective, intended recipient access terminals; and
sending the shared LABs and the unshared LABs organized based on the assigned indices.

103. A method for assigning indices to link assignment blocks (LABs) and organizing LABs based thereupon in a wireless communication environment, comprising:
allocating indices to shared LABs;
allotting indices to unshared LABs based upon access terminal capabilities; and sending the shared LABs and the unshared LABs organized based on the assigned indices.

104. A wireless communications apparatus to assign indices to link assignment blocks (LABs) and organizing LABs based thereupon in a wireless communication environment, comprising:
- a processor configured to:
  - allocate indices to shared LABs;
  - allot indices to unshared LABs based upon hashes of identifiers of respective, intended recipient access terminals; and
  - send the shared LABs and the unshared LABs organized based on the assigned indices; and
- a memory operably connected to said processor.

105. A wireless communications apparatus to assign indices to link assignment blocks (LABs) and organizing LABs based thereupon in a wireless communication environment, comprising:
- a processor configured to:
  - allocate indices to shared LABs;
  - allot indices to unshared LABs based upon access terminal capabilities; and
  - send the shared LABs and the unshared LABs organized based on the assigned indices; and
- a memory operably connected to said processor.

106. A wireless communications apparatus for decoding a subset of received link assignment blocks (LABs) in a wireless communication environment, comprising:
- means for demodulating shared LABs recognized based upon a first range of indices;
- means for identifying a second range of indices based on a hash of an access terminal identifier; and
- means for demodulating unshared LABs recognized based upon the second range of indices.

107. A wireless communications apparatus for decoding a subset of received link assignment blocks (LABs) in a wireless communication environment, comprising:
- means for demodulating shared LABs recognized based upon a first range of indices;
- means for identifying a second range of indices based on an access terminal capability measure; and
- means for demodulating unshared LABs recognized based upon the second range of indices.

108. A method for decoding a subset of received link assignment blocks (LABs) in a wireless communication environment, comprising:
- demodulating shared LABs recognized based upon a first range of indices;
- identifying a second range of indices based on a hash of an access terminal identifier; and
- demodulating unshared LABs recognized based upon the second range of indices.

109. A method for decoding a subset of received link assignment blocks (LABs) in a wireless communication environment, comprising:
- demodulating shared LABs recognized based upon a first range of indices;
- identifying a second range of indices based on an access terminal capability measure; and
- demodulating unshared LABs recognized based upon the second range of indices.

110. A wireless communications apparatus to decode a subset of received link assignment blocks (LABs) in a wireless communication environment, comprising:
- a processor configured to:
  - demodulate shared LABs recognized based upon a first range of indices;
  - identify a second range of indices based on a hash of an access terminal identifier; and
  - demodulate unshared LABs recognized based upon the second range of indices; and
- a memory operably connected to said processor.

111. A wireless communications apparatus to decode a subset of received link assignment blocks (LABs) in a wireless communication environment, comprising:
- a processor configured to:
  - demodulate shared LABs recognized based upon a first range of indices;
  - identify a second range of indices based on an access terminal capability measure; and
  - demodulate unshared LABs recognized based upon the second range of indices; and
- a memory operably connected to said processor.

* * * * *